US009260284B2

(12) United States Patent
Marina et al.

(10) Patent No.: US 9,260,284 B2
(45) Date of Patent: *Feb. 16, 2016

(54) POST-MIX BEVERAGE SYSTEM

(71) Applicant: PepsiCo, Inc., New York, NY (US)

(72) Inventors: Carlos Hernan Marina, Purchase, NY (US); Ricardo Ruiz de Gopegui, Purchase, NY (US); Agnete Enga, New York, NY (US); Vincent Faivre d'Arcier, New York, NY (US); Tim Connelly, New York, NY (US); Jonathan Cedar, New York, NY (US); Tucker Fort, New York, NY (US)

(73) Assignee: PepsiCo, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,735

(22) Filed: Apr. 18, 2014

(65) Prior Publication Data

US 2014/0326750 A1    Nov. 6, 2014

Related U.S. Application Data

(63) Continuation of application No. 12/550,101, filed on Aug. 28, 2009, now Pat. No. 8,740,020.

(60) Provisional application No. 61/093,090, filed on Aug. 29, 2008, provisional application No. 61/146,156, filed on Jan. 21, 2009.

(51) Int. Cl.
*B67D 3/00* (2006.01)
*A47J 31/40* (2006.01)
(Continued)

(52) U.S. Cl.
CPC ............ *B67D 3/0019* (2013.01); *A47J 31/407* (2013.01); *B65D 51/2821* (2013.01); *B65D 81/3211* (2013.01); *B65D 81/3222* (2013.01); *B65D 85/8043* (2013.01); *B67D 3/0058* (2013.01)

(58) Field of Classification Search
CPC ............................ B67D 3/0019; B67D 3/0058
USPC ......... 222/81, 83, 83.5, 88, 129, 325; 99/295; 141/363–366; 206/219
See application file for complete search history.

(56) References Cited

U.S. PATENT DOCUMENTS

| 2,451,195 A | 10/1948 | Brown |
| 2,778,739 A | 1/1957 | Rodth |

(Continued)

FOREIGN PATENT DOCUMENTS

| AT | 395301 T | 5/2008 |
| EP | 0905049 A1 | 3/1999 |

(Continued)

OTHER PUBLICATIONS

International Search Report in corresponding PCT Application, International Application No. PCT/US2009/055409, mailed Aug. 28, 2009.

(Continued)

*Primary Examiner* — J. Casimer Jacyna
(74) *Attorney, Agent, or Firm* — Sterne, Kessler, Goldstein & Fox PLLC

(57) ABSTRACT

A beverage dispensing system comprises a container, an attachment mechanism, and a cartridge. The container may hold a mixing solution or liquid, such as water, to be mixed with the contents of the cartridge. The attachment mechanism is generally located within the container. The attachment mechanism may comprise an engagement assembly, a piercing portion, and a valve assembly. The engagement assembly may generally receive the cartridge within the attachment mechanism. The piercing portion may generally pierce the cartridge, thereby releasing the contents of the cartridge into the container. The valve assembly may generally open upon engagement of the cartridge with the attachment mechanism. The cartridge generally engages with the attachment mechanism to open the cartridge to be dispensed into the container, thereby combining the contents of the cartridge with the liquid within the container to create a drinkable beverage.

24 Claims, 25 Drawing Sheets

(51) Int. Cl.
    *B65D 81/32*    (2006.01)
    *B65D 85/804*   (2006.01)
    *B65D 51/28*    (2006.01)

(56) References Cited

U.S. PATENT DOCUMENTS

| | | |
|---|---|---|
| 2,899,886 A | 8/1959 | Rodth |
| 2,968,560 A | 1/1961 | Goros |
| 3,030,874 A | 4/1962 | Fiori |
| 3,083,101 A | 3/1963 | Noury |
| 3,295,998 A | 1/1967 | Goros |
| 3,403,617 A | 10/1968 | Lampe |
| 3,561,349 A | 2/1971 | Endo et al. |
| 3,790,029 A | 2/1974 | Ward |
| 4,136,202 A | 1/1979 | Favre |
| 4,220,259 A | 9/1980 | Lagneaux |
| 4,391,309 A | 7/1983 | Steiner |
| 4,471,689 A | 9/1984 | Piana |
| 4,759,472 A | 7/1988 | Strenger |
| 4,808,346 A | 2/1989 | Strenger |
| 4,846,052 A | 7/1989 | Favre et al. |
| 4,867,993 A | 9/1989 | Nordskog |
| 4,886,674 A | 12/1989 | Seward et al. |
| 4,915,261 A | 4/1990 | Strenger |
| 5,008,013 A | 4/1991 | Favre et al. |
| 5,011,700 A | 4/1991 | Gustafson et al. |
| 5,083,677 A | 1/1992 | Bally et al. |
| 5,172,831 A | 12/1992 | Burrows |
| 5,197,374 A | 3/1993 | Fond |
| 5,220,259 A | 6/1993 | Werner et al. |
| 5,242,702 A | 9/1993 | Fond |
| 5,246,142 A | 9/1993 | DiPalma et al. |
| 5,277,103 A | 1/1994 | Cox |
| 5,323,832 A | 6/1994 | Burrows |
| 5,325,765 A | 7/1994 | Sylvan et al. |
| 5,327,815 A | 7/1994 | Fond et al. |
| 5,343,799 A | 9/1994 | Fond |
| 5,347,916 A | 9/1994 | Fond et al. |
| 5,398,595 A | 3/1995 | Fond et al. |
| 5,398,596 A | 3/1995 | Fond |
| 5,402,707 A | 4/1995 | Fond et al. |
| 5,472,719 A | 12/1995 | Favre |
| 5,649,472 A | 7/1997 | Fond et al. |
| 5,656,311 A | 8/1997 | Fond |
| 5,656,316 A | 8/1997 | Fond et al. |
| 5,897,899 A | 4/1999 | Fond |
| 5,948,455 A | 9/1999 | Schaeffer et al. |
| 5,980,959 A | 11/1999 | Frutin |
| 6,025,000 A | 2/2000 | Fond et al. |
| 6,026,732 A | 2/2000 | Kollep et al. |
| 6,068,871 A | 5/2000 | Fond et al. |
| 6,079,315 A | 6/2000 | Beaulieu et al. |
| 6,109,168 A | 8/2000 | Illy et al. |
| 6,117,471 A | 9/2000 | King |
| 6,161,819 A | 12/2000 | Edwards |
| 6,165,523 A | 12/2000 | Story |
| 6,182,554 B1 | 2/2001 | Beaulieu et al. |
| 6,240,832 B1 | 6/2001 | Schmed et al. |
| 6,245,371 B1 | 6/2001 | Gutwein et al. |
| 6,358,545 B1 | 3/2002 | Chandler et al. |
| 6,386,392 B1 | 5/2002 | Argentieri et al. |
| 6,405,637 B1 | 6/2002 | Cai |
| 6,606,938 B2 | 8/2003 | Taylor |
| 6,607,762 B2 | 8/2003 | Lazaris et al. |
| 6,619,188 B1 | 9/2003 | Meador |
| 6,645,537 B2 | 11/2003 | Sweeney et al. |
| 6,655,260 B2 | 12/2003 | Lazaris et al. |
| 6,740,345 B2 | 5/2004 | Cai |
| 6,758,130 B2 | 7/2004 | Sargent et al. |
| 6,758,372 B2 | 7/2004 | Studer et al. |
| 6,777,007 B2 | 8/2004 | Cai |
| 6,805,041 B2 | 10/2004 | Colston et al. |
| 6,810,788 B2 | 11/2004 | Hale |
| 6,849,285 B2 | 2/2005 | Masek et al. |
| 6,869,627 B2 | 3/2005 | Perkovic et al. |
| D506,926 S | 7/2005 | Halliday et al. |
| 6,948,420 B2 | 9/2005 | Kirschner et al. |
| 6,966,251 B2 | 11/2005 | Yoakim |
| 6,971,304 B1 | 12/2005 | Lin |
| 6,994,015 B2 | 2/2006 | Bruinsma |
| 6,997,103 B2 | 2/2006 | Shaw et al. |
| 7,028,604 B2 | 4/2006 | Cortese |
| 7,032,818 B2 | 4/2006 | Thomas et al. |
| 7,059,239 B2 | 6/2006 | Balkau |
| 7,077,053 B2 | 7/2006 | Kraan |
| 7,097,074 B2 | 8/2006 | Halliday et al. |
| 7,100,496 B2 | 9/2006 | Majer Doglioni |
| 7,131,369 B2 | 11/2006 | Gantt et al. |
| 7,153,530 B2 | 12/2006 | Masek et al. |
| 7,165,488 B2 | 1/2007 | Bragg et al. |
| 7,210,401 B1 | 5/2007 | Rolfes et |
| 7,213,506 B2 | 5/2007 | Halliday et al. |
| 7,219,598 B2 | 5/2007 | Halliday et al. |
| 7,226,628 B2 | 6/2007 | Cai |
| 7,231,869 B2 | 6/2007 | Halliday et al. |
| 7,243,597 B2 | 7/2007 | Hu et al. |
| 7,243,598 B2 | 7/2007 | Halliday et al. |
| 7,255,039 B2 | 8/2007 | Halliday et al. |
| 7,258,061 B2 | 8/2007 | Campbell et al. |
| 7,279,188 B2 | 10/2007 | Arrick et al. |
| 7,287,461 B2 | 10/2007 | Halliday et al. |
| 7,308,851 B2 | 12/2007 | Halliday |
| 7,316,178 B2 | 1/2008 | Halliday et al. |
| 7,318,372 B2 | 1/2008 | Cooke |
| 7,320,274 B2 | 1/2008 | Castellani |
| 7,322,277 B2 | 1/2008 | Halliday et al. |
| 7,328,651 B2 | 2/2008 | Halliday et al. |
| 7,340,990 B2 | 3/2008 | Halliday et al. |
| D567,021 S | 4/2008 | Bach et al. |
| 7,350,456 B2 | 4/2008 | Blanc et al. |
| 7,439,859 B2 | 10/2008 | Humphrey |
| 8,091,735 B2 | 1/2012 | Girard et al. |
| 8,695,819 B1 | 4/2014 | Anderson |
| 8,740,020 B2 * | 6/2014 | Marina et al. ................. 222/325 |
| 2001/0048957 A1 | 12/2001 | Lazaris et al. |
| 2001/0052294 A1 | 12/2001 | Schmed |
| 2002/0015768 A1 | 2/2002 | Masek et al. |
| 2002/0020659 A1 | 2/2002 | Sweeney et al. |
| 2002/0023543 A1 | 2/2002 | Schmed |
| 2002/0048321 A1 | 4/2002 | Katayama |
| 2002/0048621 A1 | 4/2002 | Boyd et al. |
| 2002/0076471 A1 | 6/2002 | Olsson |
| 2002/0078831 A1 | 6/2002 | Cai |
| 2002/0088807 A1 | 7/2002 | Perkovic et al. |
| 2002/0121198 A1 | 9/2002 | Kollep et al. |
| 2002/0129712 A1 | 9/2002 | Westbrook et al. |
| 2002/0139839 A1 | 10/2002 | Catan |
| 2002/0144603 A1 | 10/2002 | Taylor |
| 2002/0144604 A1 | 10/2002 | Winkler et al. |
| 2002/0148356 A1 | 10/2002 | Lazaris et al. |
| 2003/0005826 A1 | 1/2003 | Sargent et al. |
| 2003/0039731 A1 | 2/2003 | Dalton et al. |
| 2003/0056655 A1 | 3/2003 | Kollep et al. |
| 2003/0071806 A1 | 4/2003 | Annand |
| 2003/0159589 A1 | 8/2003 | Meador |
| 2003/0222089 A1 | 12/2003 | Hale |
| 2004/0005384 A1 | 1/2004 | Cai |
| 2004/0055472 A1 | 3/2004 | Stoner |
| 2004/0115310 A1 | 6/2004 | Yoakim et al. |
| 2004/0173102 A1 | 9/2004 | Halliday et al. |
| 2004/0177764 A1 | 9/2004 | Halliday et al. |
| 2004/0177765 A1 | 9/2004 | Halliday |
| 2004/0180119 A1 | 9/2004 | Halliday et al. |
| 2004/0180123 A1 | 9/2004 | Halliday et al. |
| 2004/0182250 A1 | 9/2004 | Halliday et al. |
| 2004/0182251 A1 | 9/2004 | Halliday et al. |
| 2004/0187695 A1 | 9/2004 | Halliday et al. |
| 2004/0187696 A1 | 9/2004 | Halliday et al. |
| 2004/0188459 A1 | 9/2004 | Halliday et al. |
| 2004/0191370 A1 | 9/2004 | Halliday et al. |
| 2004/0191371 A1 | 9/2004 | Halliday et al. |
| 2004/0191372 A1 | 9/2004 | Halliday et al. |
| 2004/0197444 A1 | 10/2004 | Halliday et al. |
| 2004/0206245 A1 | 10/2004 | Halliday et al. |

(56) References Cited

U.S. PATENT DOCUMENTS

| | | |
|---|---|---|
| 2004/0208960 A1 | 10/2004 | Marshall |
| 2004/0211322 A1 | 10/2004 | Halliday et al. |
| 2004/0211742 A1 | 10/2004 | Deans |
| 2004/0250686 A1 | 12/2004 | Hale |
| 2005/0029287 A1 | 2/2005 | Mobbs |
| 2005/0034604 A1 | 2/2005 | Halliday et al. |
| 2005/0103204 A1 | 5/2005 | Halliday et al. |
| 2005/0150390 A1 | 7/2005 | Schifferle |
| 2005/0172822 A1 | 8/2005 | Macchi et al. |
| 2005/0183581 A1 | 8/2005 | Kirschner et al. |
| 2005/0223904 A1 | 10/2005 | Laigneau et al. |
| 2005/0266122 A1 | 12/2005 | Franceschi |
| 2006/0000851 A1 | 1/2006 | Girard et al. |
| 2006/0016347 A1 | 1/2006 | Girard et al. |
| 2006/0065127 A1 | 3/2006 | Dalton et al. |
| 2006/0071000 A1 | 4/2006 | Weist et al. |
| 2006/0144242 A1 | 7/2006 | Mitchell et al. |
| 2006/0144244 A1 | 7/2006 | Girard et al. |
| 2006/0196363 A1 | 9/2006 | Rahn |
| 2006/0196364 A1 | 9/2006 | Kirschner |
| 2006/0236871 A1 | 10/2006 | Ternite et al. |
| 2006/0251771 A1 | 11/2006 | Yokota |
| 2006/0266222 A1 | 11/2006 | Hammad |
| 2006/0278093 A1 | 12/2006 | Biderman et al. |
| 2006/0280841 A1 | 12/2006 | Cai |
| 2006/0289316 A1 | 12/2006 | Henry |
| 2007/0012719 A1 | 1/2007 | Holler |
| 2007/0039479 A1 | 2/2007 | Dalton et al. |
| 2007/0059672 A1 | 3/2007 | Shaw |
| 2007/0104837 A1 | 5/2007 | Yoakim et al. |
| 2007/0144356 A1 | 6/2007 | Rivera |
| 2007/0144357 A1 | 6/2007 | Rivera |
| 2007/0157821 A1 | 7/2007 | Panesar et al. |
| 2007/0158366 A1 | 7/2007 | Van Deer Meer et al. |
| 2007/0163446 A1 | 7/2007 | Halliday et al. |
| 2007/0175334 A1 | 8/2007 | Halliday et al. |
| 2007/0181005 A1 | 8/2007 | Kirschner et al. |
| 2007/0186784 A1 | 8/2007 | Liverani et al. |
| 2007/0209524 A1 | 9/2007 | Kim |
| 2007/0221066 A1 | 9/2007 | Sullivan et al. |
| 2007/0221069 A1 | 9/2007 | Rahn et al. |
| 2007/0259074 A1 | 11/2007 | Searchilli et al. |
| 2007/0288252 A1 | 12/2007 | Weinberg |
| 2007/0289453 A1 | 12/2007 | Halliday et al. |
| 2008/0028948 A1 | 2/2008 | Kirschner et al. |
| 2008/0029541 A1 | 2/2008 | Wallace et al. |
| 2008/0092747 A1 | 4/2008 | Yoakim et al. |
| 2008/0115675 A1 | 5/2008 | Suggi Liverani et al. |
| 2008/0116086 A1 | 5/2008 | Hung |
| 2008/0121111 A1 | 5/2008 | Paget et al. |
| 2008/0134901 A1 | 6/2008 | Cortese |
| 2008/0134902 A1 | 6/2008 | Zimmerman et al. |
| 2008/0135424 A1 | 6/2008 | Ostrowski |
| 2008/0148948 A1 | 6/2008 | Evers et al. |
| 2008/0149669 A1 | 6/2008 | Nicholson et al. |
| 2008/0156196 A1 | 7/2008 | Doglioni Majer |
| 2008/0160153 A1 | 7/2008 | Hestekin et al. |
| 2008/0173705 A1 | 7/2008 | Girard et al. |
| 2008/0210408 A1 | 9/2008 | Sterngold et al. |
| 2008/0230571 A1 | 9/2008 | Sterngold et al. |
| 2008/0319876 A1 | 12/2008 | Goldburt |
| 2009/0155422 A1 | 6/2009 | Ozanne |
| 2010/0025267 A1 | 2/2010 | Brand |
| 2010/0045705 A1 | 2/2010 | Vertegaal et al. |
| 2010/0300913 A1 | 12/2010 | Goldburt |
| 2011/0166910 A1 | 7/2011 | Marina et al. |
| 2012/0040018 A1 | 2/2012 | Thierman et al. |

FOREIGN PATENT DOCUMENTS

| | | |
|---|---|---|
| EP | 1440904 A1 | 7/2004 |
| EP | 1774878 A1 | 4/2007 |
| FR | 2764868 A1 | 12/1998 |
| GB | 2335179 A | 9/1999 |
| JP | HEI 02-231043 | 9/1990 |
| JP | 2002293332 A | 10/2002 |
| JP | 2004054609 A | 2/2004 |
| JP | 2007275226 A | 10/2007 |
| JP | 2009018195 A | 1/2009 |
| JP | 2009234656 A | 10/2009 |
| JP | 2010537916 A | 12/2010 |
| JP | 2012501281 A | 1/2012 |
| WO | 0228241 A1 | 4/2002 |
| WO | 2005077811 A2 | 8/2005 |
| WO | 2006062418 A1 | 6/2006 |
| WO | 2006128695 A2 | 12/2006 |
| WO | 2007025773 A2 | 3/2007 |
| WO | 2009082198 A1 | 7/2009 |
| WO | 2010025392 A2 | 3/2010 |
| WO | 2011089049 A1 | 7/2011 |

OTHER PUBLICATIONS

Partial European Search Report in related European Patent Application No. 11007575.1; issued Nov. 16, 2011.
International Search Report in corresponding International PCT Application No. PCT/US2011/067801; dated Jun. 20, 2012.
Chinese Office Action in related Chinese Application No. 200980140069.1; dated Apr. 6, 2012.
International Search Report and Written Opinion from International PCT Application No. PCT/US2012/071900; dated Mar. 20, 2013.
U.S. Office Action from U.S. Appl. No. 12/982,374; dated Mar. 29, 2013.
U.S. Office Action from U.S. Appl. No. 13/342,550; mailed May 8, 2013.
Extended European Search Report ini corresponding European Patent Application No. 11007575.1; issued Mar. 20, 2012.
Canadian Office Action in related Canadian Application No. 2734689; dated Jul. 30, 2012.
European Office Action in related European Application No. 11007575.1; dated Apr. 23, 2012.
Chinese Office Action in related Chinese Application No. 200980140069.1; dated Feb. 17, 2013.
U.S. Office Action from U.S. Appl. No. 12/550,101; dated Jan. 29, 2013.
Nov. 21, 2014—(US) Non-Final Office Action—U.S. Appl. No. 12/982,374.
May 21, 2014 (EP) Extended Search Report—App 14162737.2.
Oct. 28, 2014—(JP) Notice of Grounds of Rejection—App 2013-240902—Eng Tran.
Extended European Search Report from European Patent Application No. 14162737.2 dated May 21, 2014.
Final Office Action from U.S. Appl. No. 12/982,374 dated Jul. 8, 2014.

\* cited by examiner

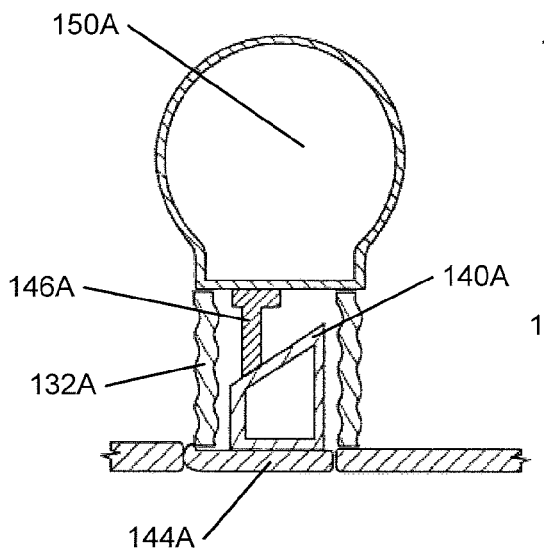
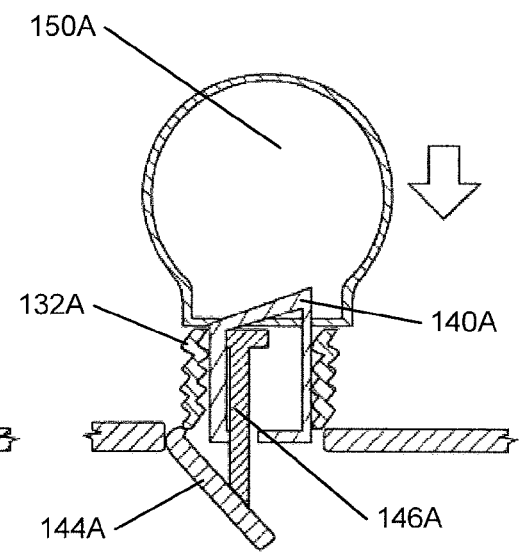
FIG. 2A1
FIG. 2A2
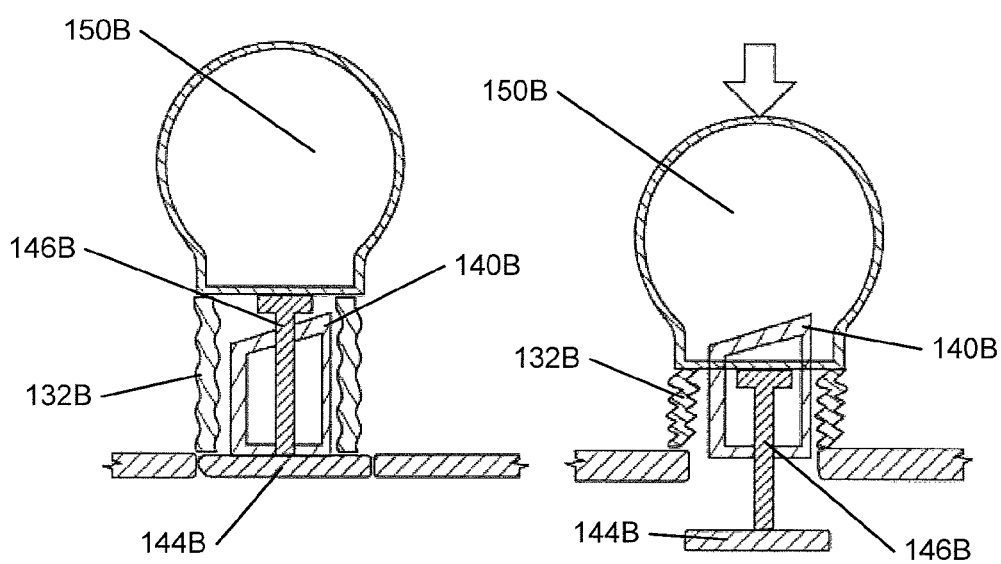
FIG. 2B1
FIG. 2B2

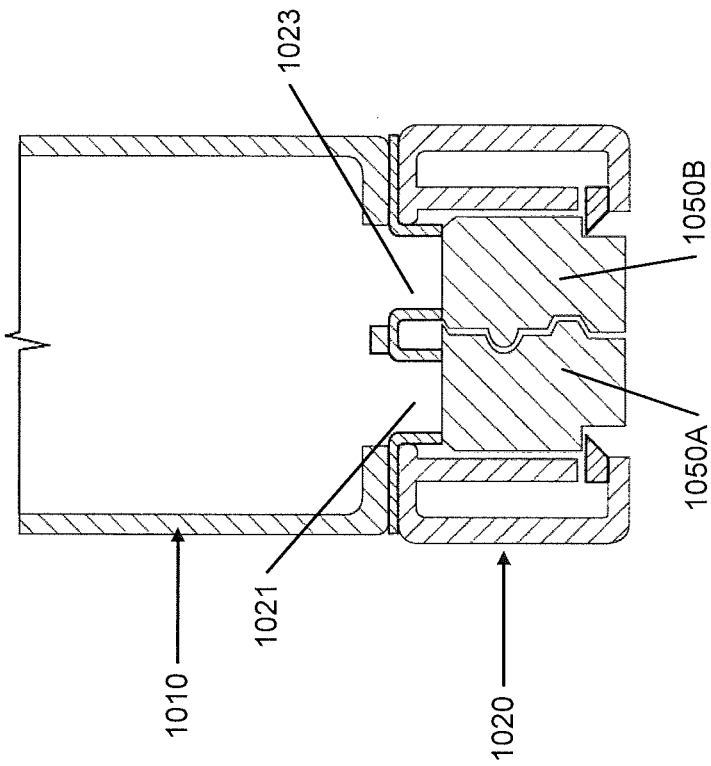
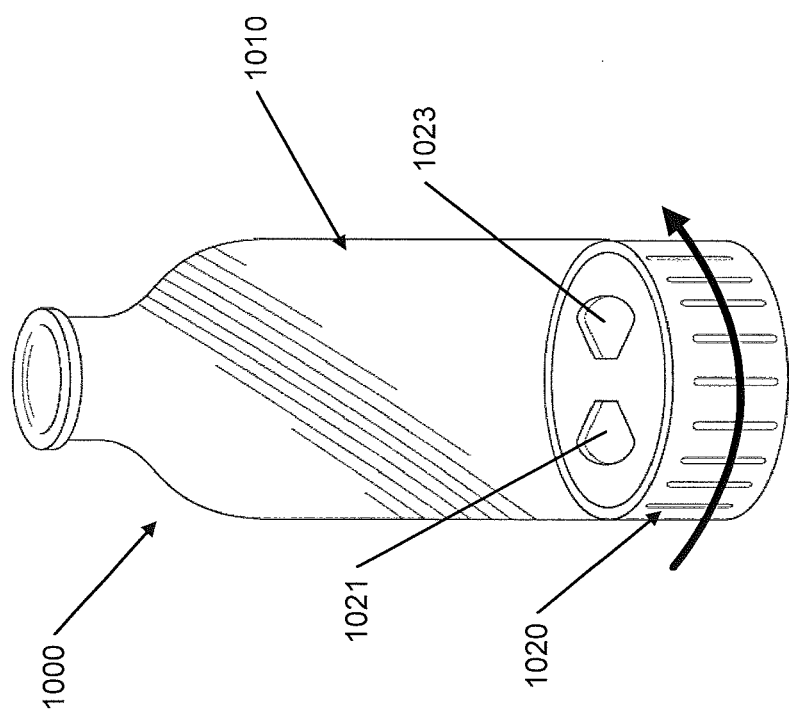
FIG. 10B
FIG. 10A

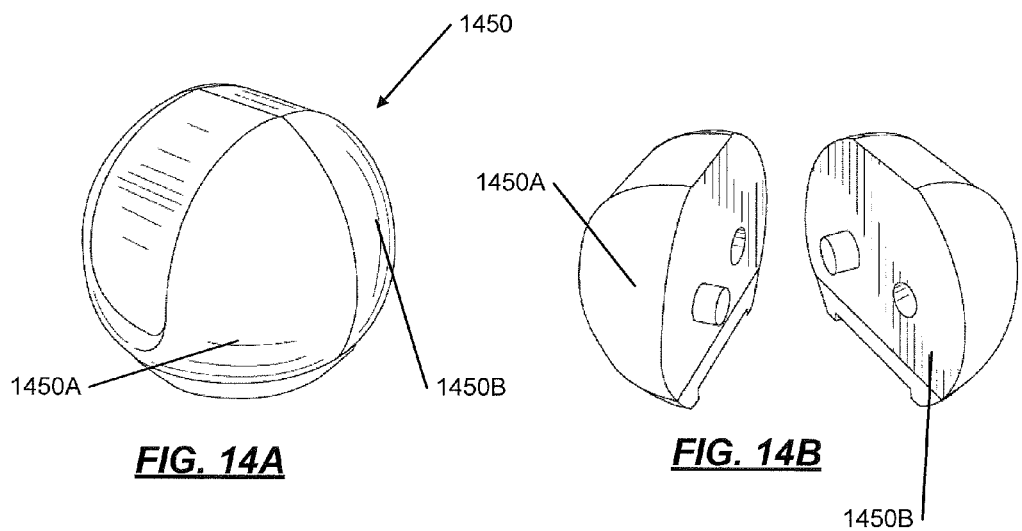
*FIG. 14A*                *FIG. 14B*
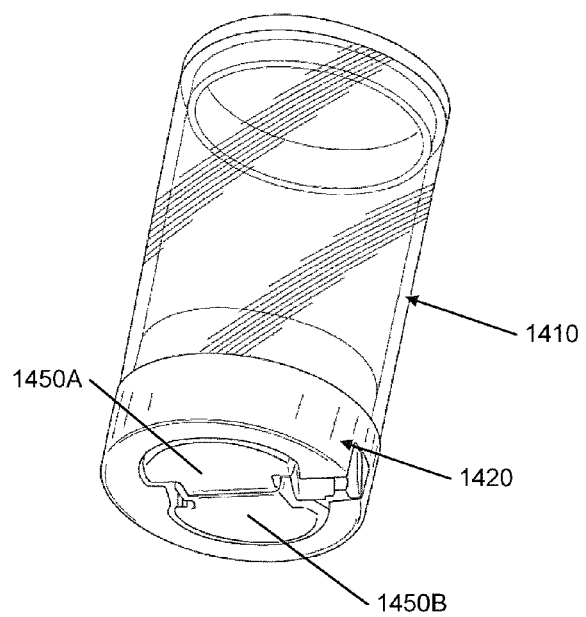
*FIG. 14C*

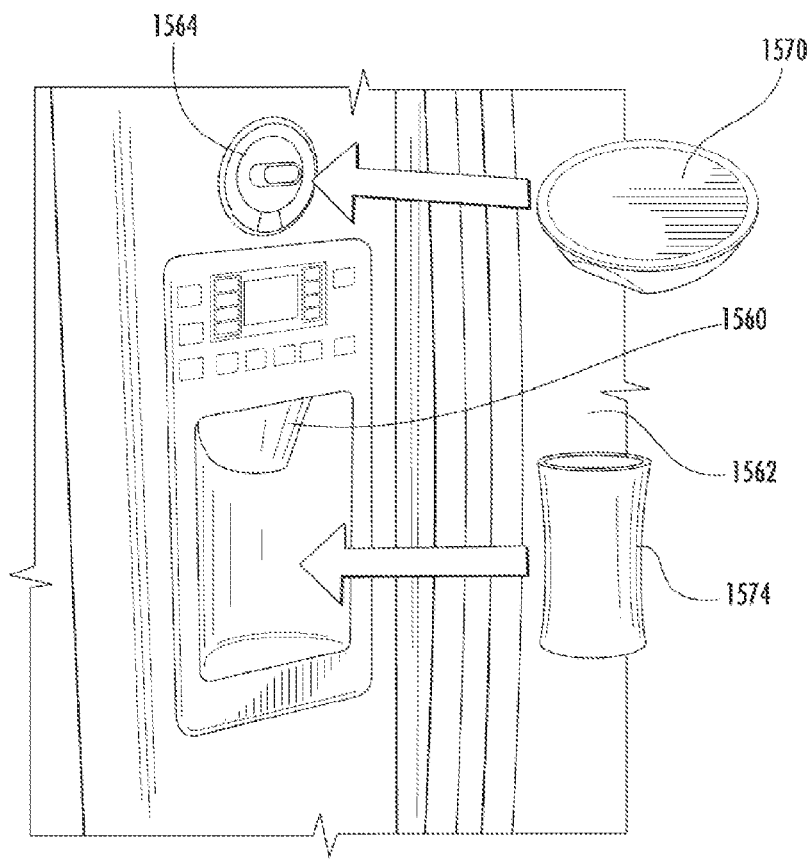
*FIG. 23*
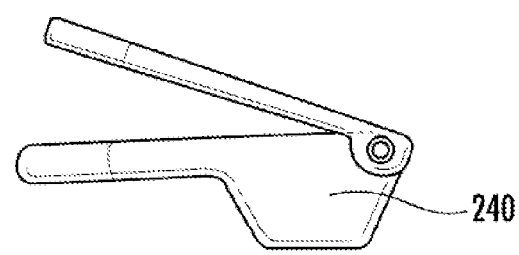
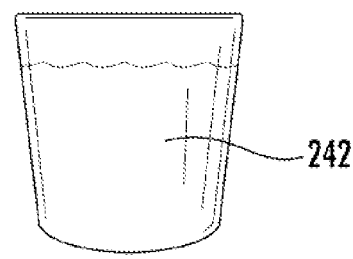
*FIG. 24*

POST-MIX BEVERAGE SYSTEM

This application is a continuation to U.S. Non-Provisional Application, U.S. Ser. No. 12/550,101, filed Aug. 28, 2009, which claims priority to Provisional Application, U.S. Ser. No. 61/093,090, filed Aug. 29, 2008, and Provisional Application, U.S. Ser. No. 61/146,156, filed Jan. 21, 2009, which are both incorporated herein by reference in its entirety.

FIELD OF THE INVENTION

The present invention relates generally to beverage dispensers and more particularly to post-mix beverage systems.

BACKGROUND

It is known that beverages are marketed, delivered and sold in a variety of different types of containers. The type of container utilized may depend on several factors, including, for example, the consumer for which the beverage is being marketed towards, the distribution channel(s), and/or the quantity of beverage being sold. In this regard, beverages marketed towards consumers are often distributed in plastic bottles. Unfortunately, however, a large portion the plastic bottles are disposed of as waste. While recycling efforts have increased, the bottles are purchased and consumed in areas where recycling is not available or feasible. Furthermore, plastic lids used for sealing the bottles are generally not recyclable and end up as waste, or worse yet, as litter throughout the environment. Additionally, these wasteful plastic bottles are also marketed and sold as "multi-packs" in which further packaging, such as shrink-wrap and/or cardboard must be utilized to contain individual bottles together as a multi-pack. Thus, such prior art delivery mechanisms generate a vast quantity of unwanted and unneeded waste.

In addition to having an adverse environmental impact, most prior art containers use valuable space, both in the retail environment and at the end-users' location, such as their homes. Past systems, known as "post-mix" systems, attempted to alleviate some of these drawbacks by selling concentrated beverage syrups designed to be diluted with a liquid, such as water. While known post-mix systems reduce waste associated with other delivery mechanisms, such as plastic bottles, these systems require large, expensive systems that are too complicated and cumbersome for use by consumers other than retail establishments that sell large quantities of beverages. Even for such establishments, the knowledge and costs required to maintain these conventional post-mix systems is inconvenient. Furthermore, past systems are known to require calibration on a regular basis to ensure that the correct amount of syrup is properly combined with the liquid. In this regard, any miscalibration or failure of the machine is often only discovered after several customers complain about the taste of the beverage and further time is required to check and fix the ratio of syrup to liquid.

SUMMARY

The following presents a general summary of aspects of the invention in order to provide a basic understanding of at least some of its aspects. This summary is not intended as an extensive overview of the invention. It is not intended to identify key or critical elements of the invention or to delineate the scope of the invention. The following summary merely presents some concepts of the invention in a general form as a prelude to the more detailed description below.

Aspects of this invention relate to beverage dispensing system that comprises a container, an attachment mechanism located within the container, and a cartridge adapted to engage the attachment mechanism. The attachment mechanism may comprise an engagement assembly, a piercing portion, and a valve. The cartridge comprises a pod and a cap. The pod includes a chamber, an opening, and a cover located over the opening, wherein the cap is attached to the top of the chamber. Additionally, when the cartridge is engaged with the attachment mechanism, the engagement assembly holds the cartridge within the attachment mechanism, the piercing portion pierces through the cap and the cover, and the valve extends into the container.

Additional aspects of this invention relate to the cap including a foil retainer, wherein when the cartridge engages the engagement assembly, the piercing portion pushes against the foil retainer, thereby piercing the cover with the foil retainer. Additionally, the foil retainer may hold the cover over without allowing the cover to close over the opening of the cartridge.

Additional aspects of this invention relate to the cartridge and pod being generally a circular-shaped vessel. Additionally, the cartridge may hold one or more beverage ingredients, wherein the beverage ingredients may be selected from the list comprising: syrup, paste, powder, or granules.

Additional aspects of this invention relate to a beverage system that comprises a housing that includes a first opening and a second opening a cartridge defined as a dome-shaped vessel. The cartridge contains a beverage ingredient and the cartridge is sized and shaped to be received inside the first opening. The cartridge may include a sealing material positioned across the cartridge to seal the beverage ingredient within the cartridge. The beverage system may also include a water supply system. The water supply system may include a water supply line operatively connected at one end to a water source and at an opposing end to a needle. The needle may define a pointed open end to puncture the sealing material and the cartridge. Additionally, once the needle is positioned within the cartridge, water is passed into the cartridge to mix with the beverage ingredient to form a desired beverage. Additionally, the second opening may be sized and shaped to receive a beverage cup, the beverage cup capable of holding the desired from the beverage system.

Additional aspects of this invention relate to a method for producing a beverage using a beverage dispensing system. The method comprises the steps of: (a) inserting a cartridge into a container, the cartridge comprising a pod and a cap, wherein the pod includes a chamber, an opening and a cover located over the opening; (b) rotating or positioning the cartridge into an attachment mechanism located within the container, wherein the attachment mechanism comprises an engagement assembly, a piercing portion, and a valve; (c) applying pressure on the cartridge thereby releasing the valve into the container and piercing the cover with the piercing portion; (d) mixing the contents of the container; and (e) releasing the cartridge from the container.

BRIEF DESCRIPTION OF THE DRAWINGS

A more complete understanding of the present invention and certain advantages thereof may be acquired by referring to the following description in consideration with the accompanying drawings, in which like reference numbers indicate like features, and wherein:

FIGS. 2A1 and 2A2 illustrate a close-up view a portion of the beverage dispensing system from FIG. 1 in accordance with the present invention;

FIGS. 2B1 and 2B2 illustrate another close-up view a portion of the beverage dispensing system from FIG. 1 in accordance with the present invention;

FIGS. 9A through 13B illustrate various examples of an attachment mechanism for a beverage dispensing system in accordance with the present invention;

FIGS. 14A through 14C illustrate an example half-pod cartridge in accordance with the present invention;

FIGS. 21-23 illustrates an alternative example of a beverage system that may configured with a refrigerator in various configurations in accordance with the present invention;

FIG. 24 illustrates an alternative example of a beverage system in accordance with the present invention.

The reader is advised that the attached drawings are not necessarily drawn to scale.

DETAILED DESCRIPTION

In the following description of various examples of the invention, reference is made to the accompanying drawings, which form a part hereof, and in which are shown by way of illustration various example structures, systems, and steps in which aspects of the invention may be practiced. It is to be understood that other specific arrangements of parts, structures, example devices, systems, and steps may be utilized and structural and functional modifications may be made without departing from the scope of the present invention. Also, while the terms "top," "bottom," "front," "back," "side," and the like may be used in this specification to describe various example features and elements of the invention, these terms are used herein as a matter of convenience, e.g., based on the example orientations shown in the figures. Nothing in this specification should be construed as requiring a specific three dimensional orientation of structures in order to fall within the scope of this invention.

Figure 1:
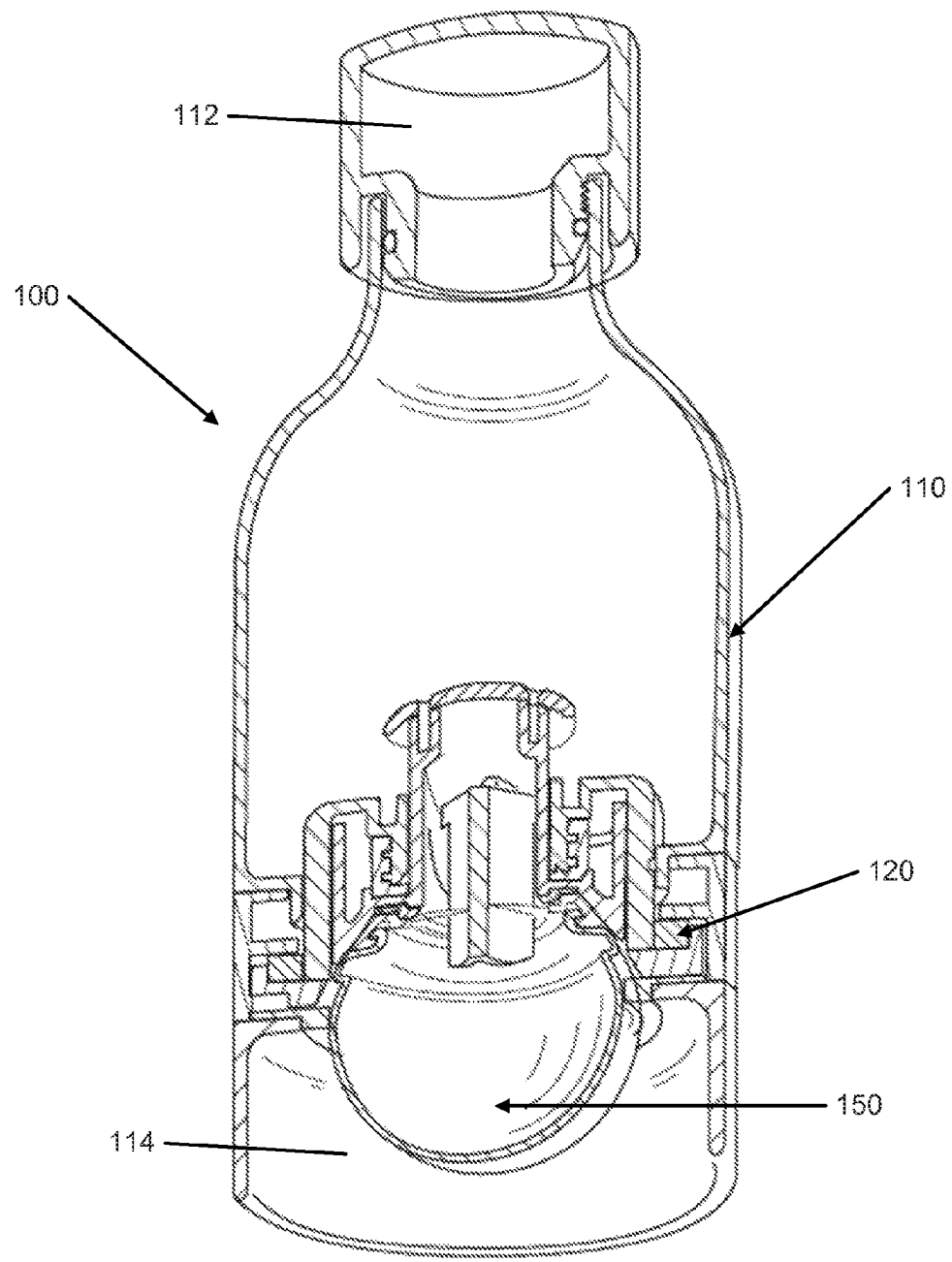
FIG. 1 illustrates a perspective view of a beverage dispensing system in accordance with the present invention.

FIG. 1 illustrates an example of a beverage dispensing system 100 in accordance with the present invention. The beverage dispensing system 100 includes a container 110, an attachment mechanism 120 and a cartridge 150. The container 110 may hold a mixing solution or liquid, such as water, to be mixed with the contents of the cartridge 150. The attachment mechanism 120 is generally located within the container 110. The cartridge 150 generally engages with the attachment mechanism 120 to open the cartridge 150 to be dispensed into the container 110, thereby combining the contents of the cartridge 150 with the liquid within the container 110 to create a drinkable beverage.

The container 110, as illustrated in FIG. 1, may be generally in the shape of a bottle. The container 110 may be a variety of other shapes, without departing from this invention. The container 110 may include a cap 112. The cap 112 may seal an opening at the top of the container 110 where a user can drink from the container 110. Additionally, the container 110 may include a base or bezel 114. The cartridge 150 may be inserted through the base or bezel 114 to engage the cartridge 150 with the attachment mechanism 120. As illustrated in FIG. 1, this base or bezel 114 is located at the bottom of the container 110. The base or bezel 114 may be located at different areas of the container 110 as discussed below without departing from this invention.

Figure 1A:
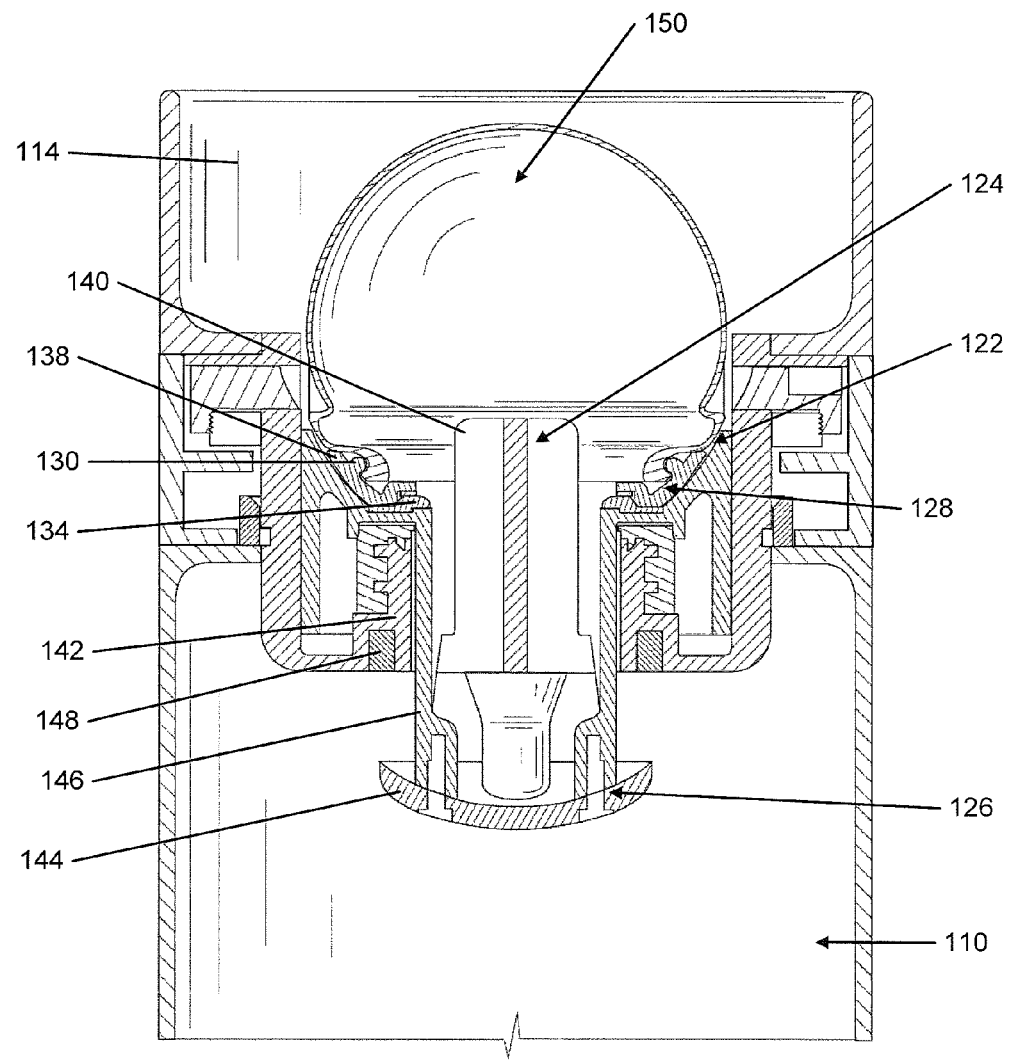
FIG. 1A illustrates a cross-sectional view of the beverage dispensing system from FIG. 1 in accordance with the present invention.

The attachment mechanism 120, as illustrated in FIGS. 1 and 1A, comprises an engagement assembly 122, a piercing portion 124, and a valve assembly 126. The engagement assembly 122 may generally receive the cartridge 150 within the attachment mechanism 120. The piercing portion 124 may generally pierce the cartridge 150, thereby releasing the contents of the cartridge 150 into the container 110. The valve assembly 126 may generally open upon engagement of the cartridge 150 with the attachment mechanism 120 thereby allowing the mixing of the contents of the container 110 with the contents of the cartridge 150.

The engagement assembly 122 may include a locking mechanism 128 to engage and hold the cartridge 150 in the container 110. The locking mechanism 128 may include a rib 130 which matches with and engages the cartridge 150. The locking mechanism 128 may also include a spring (not shown in FIG. 1A), such that when the cartridge 150 is inserted into the engagement assembly 122, the spring provides a biasing force to the cartridge 150 to more easily engage the rib 130. Additionally, the locking mechanism 128 may include a cam or a lever 134 such that when the cartridge 150 is snapped into a locked position, the piercing portion 124 and valve assembly 126 are engaged as will be explained below. The spring may also bias against the cartridge 150 as the cartridge 150 is snapped into the locked position.

Additionally, the engagement assembly 122 may include a releasing mechanism 136 wherein the releasing mechanism 136 releases the locking mechanism 128 to release the cartridge 150. The releasing mechanism 136 may be in the form of a rotating bezel, wherein the user can release the cartridge 150 by rotating the bezel (as shown in FIG. 4F). The rotation of the bezel may eject the cartridge 150 and return the attachment mechanism 120 to the starting position. Additionally, the releasing mechanism 136 may be in the form of a release button or a release lever, wherein the user may press the release button or slide the release lever to release the cartridge 150. Other means to release the cartridge 150 may be used with the engagement assembly 122 without departing from this invention.

The engagement assembly 122 may also include a cartridge sealing portion 138. The cartridge sealing portion 138 seals the area around the top of the cartridge 150 to the engagement assembly 122 when the cartridge 150 is snapped into a locked position. The cartridge sealing portion 138 ensures that the liquid or solution is contained within the cartridge 150 during the mixing process. The cartridge sealing portion 138 may include a gasket, o-ring, or grommet or other sealing structures in accordance with this invention. The cartridge sealing portion 138 may be made of rubber, plastic, or metal or other materials in accordance with this invention.

As illustrated in FIG. 1, the piercing portion 124 of the attachment mechanism 120 may include an opening structure 140. The piercing portion 124 may be cooperatively engaged to the cam or lever 134 such that when the cartridge 150 is pressed into the engagement assembly 122, the cartridge 150 is pressed against the piercing portion 124, and the piercing portion 124 slides into the opening 158 of the pod 152. The opening structure 140 may be sharp enough to pierce the cover 160 of the cartridge 150, thereby breaking the cover 160 on the pod 152, and allowing the contents of the cartridge 150 to mix with the contents of the container 110.

In another example in accordance with this invention, in cooperation with a foil retainer 166 as explained below, the opening structure 140 may be shaped such that it corresponds specifically with the flaps or retaining portions 170 on the foil retainer 166. In this example, when the cartridge 150 is pressed against the piercing portion 124, the opening structure 140 puts pressure against the foil retainer 166, specifically the flaps or retaining portions 170 on the foil retainer 166. The pressure from the opening structure 140 causes the flaps 170 to break open, and fold into the cover 160 (if present), thereby piercing the cover 160 on the pod 152, and allowing the contents of the cartridge 150 to mix with the contents of the container 110. It is important to note that the specific arrangement and configuration of the opening structure 140 must match the flaps 170 on the foil retainer 166 for the opening structure 140 to adequately pressure and break the foil retainer 166. If the opening structure 140 and flaps 170 on the foil retainer 166 do not match, it is possible that the cover 160 will not be broken when the cartridge 150 is pressed into the locked position.

The piercing portion 124 may also include an internal sealing portion 142. The internal sealing portion 142 seals the area around opening structure 140 when the cartridge 150 is snapped into a locked position. The internal sealing portion 142 ensures that the liquid or solution is contained within the cartridge 150 during the mixing process.

The valve assembly 126, as illustrated in FIG. 1A, may generally open upon engagement of the cartridge 150 with the attachment mechanism 120 thereby allowing the mixing of the contents of the container 110 with the contents of the cartridge 150. The valve assembly 126 may include a valve 144 and an elevator 146. The valve 144 may be cooperatively engaged with the elevator 146 and with the cam or lever 134 of the engagement assembly 122, such that when the cartridge 150 is snapped into the locked position and engages the cam or lever 134 of the engagement assembly 122, the valve 144 is moved from a closed position to an open position. Generally, as pressure is applied to the cartridge 150 and the cartridge 150 is snapped into the locked position, the elevator 146 moves and thereby engages the valve 144 and moves the valve 144 to the open position.

In one example in accordance with this invention, as illustrated in FIG. 2A, the valve assembly 126 may be in the form of a door-type valve 144A. The valve 144A, as illustrated in FIG. 2A may be hinged at one side, such that as pressure is applied to the cartridge 150A and thereby to the elevator 146A and the spring 132A, the valve 144A swings to the open position and into the container 110. Additionally, as the cartridge 150A is pushed, the opening structure 140A moves into the cartridge 150A. As the valve 144A swings to the open position into the container 110, the contents of the cartridge 150A and the contents of the container 110 can then mix.

In another example in accordance with this invention, as illustrated in FIG. 2B, the valve assembly 126 may be in the form of a plunger-type valve 144B. The valve 144B, as illustrated in FIG. 2B, may slide into the container 110 as one piece as pressure is applied to the cartridge 150B and thereby to the elevator 146B and to the spring 132B. When the elevator 146B is pushed against the valve 144B, the valve 144B moves from the closed position to the open position and into the container 110. Additionally, as the cartridge 150B is pushed, the opening structure 140B moves into the cartridge 150B. As the valve 144B slides to the open position, the contents of the cartridge 150B and the contents of the container 110 can then mix.

The valve assembly 126 may also include a valve sealing portion 148. The valve sealing portion 148 seals the area between the valve 144 and the container 110 when the cartridge 150 is not snapped into the locked position. Prior to the engagement of the cartridge 150 in the engagement assembly 122, the container 110 may contain a liquid and the valve sealing portion 148 ensures that the liquid or solution is contained within the container 110 when there is no cartridge 150 and the valve 144 is in the closed position. The valve sealing portion 148 may include a gasket, o-ring, or grommet or other sealing structures in accordance with this invention. The valve sealing portion 148 may be made of rubber, plastic, or metal or other materials in accordance with this invention.

Figure 3:
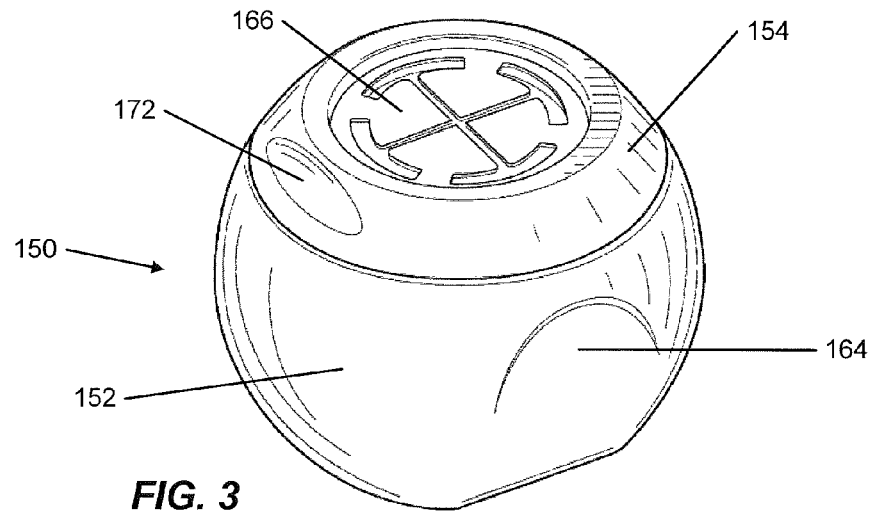
FIGS. 3 through 3D illustrate an exemplary cartridge for the beverage dispensing system from FIG. 1 in accordance with the present invention.
Figure 3A:
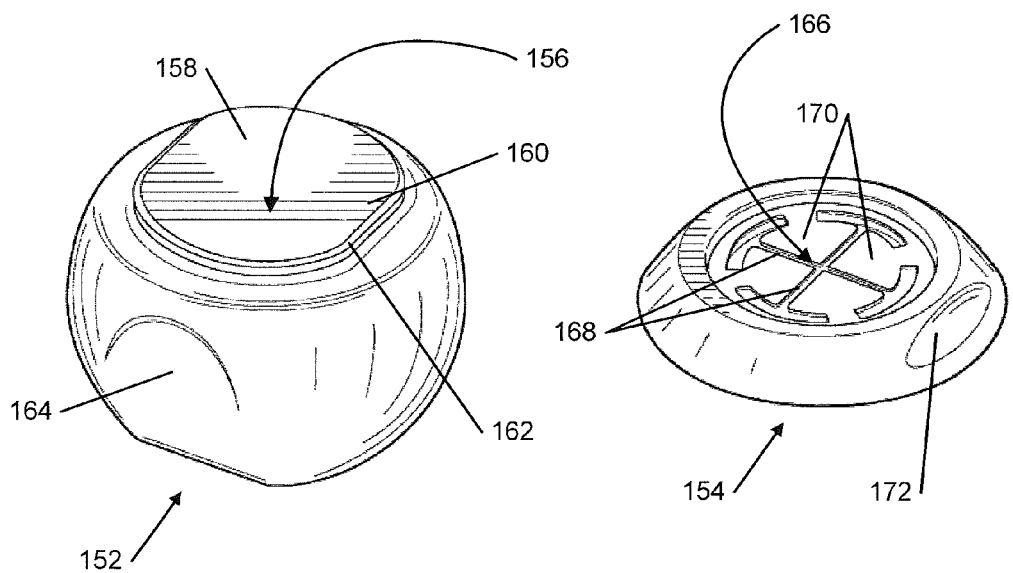

The cartridge 150, as illustrated in FIGS. 3 and 3A, may comprise a pod 152 and a cap 154. The cartridge 150 is adapted to engage the attachment mechanism 120 at the engagement assembly 122. The cartridge 150 may hold one ore more beverage ingredients, wherein the beverage ingredients may be selected from the list comprising: syrup, paste, powder, granules, or other compositions. Additionally, the cartridge 150 may hold other ingredients or flavors, such as nutrients or vitamins, in accordance with this invention.

The pod 152 is generally a vessel capable of holding a syrup, paste, powder, granules or other compositions. The pod 152 as shown in FIGS. 3 and 3A is a circular-shaped structure that includes a chamber 156, an opening 158, and a cover 160. The cover 160 may be located over the opening 158 of the pod 152. An engaging portion 162 may be located near the opening 158, wherein the engaging portion 162 may be a snap structure that engages the cap 154. Additionally, the engaging portion 162 on the pod 152 may include threads that may engage threaded structures on the cap 154.

Figure 3B:
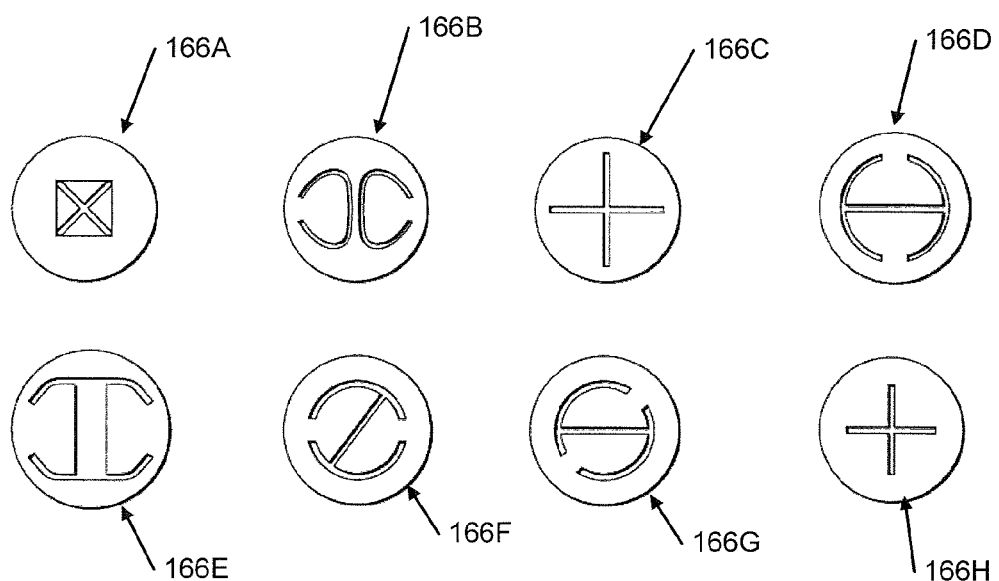
Figure 3C:
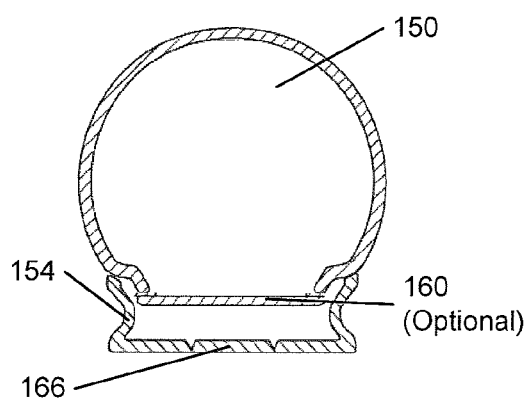
Figure 3D:
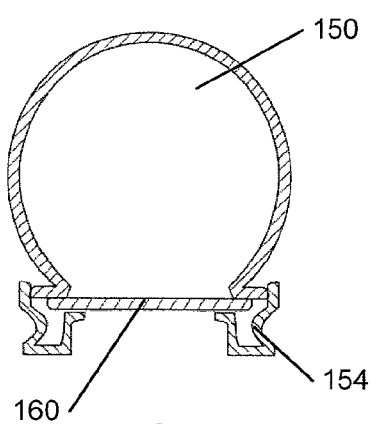

As illustrated in FIGS. 3C and 3D, the cover 160 may be a foil seal located over the opening 158 of the pod 152. The cover 160 may be attached to the edges of the opening 158 of the pod 152. The cover 160 may be made of a variety of different materials in accordance with this invention, such as: aluminum and sealing coatings or laminated with sealing polymers like polyethylene, metallized bioriented polypropylene and sealing coatings or laminated with sealing polymers like polyethylene, or metallized polyester and sealing coatings or laminated with sealing polymers like polyethylene.

In an additional example in accordance with this invention, the pod 152 may include a locking portion 164. The locking portion 164 may be engaged with the engagement assembly 122 of the attachment mechanism 120 to snap the cartridge 150 into the attachment mechanism 120.

As illustrated in FIG. 3C, the cap 154 may be attached to the top of the chamber 156. The cap 154 may be a snap-on type cap, wherein the cap 154 may snap onto the top of the chamber 156. The cap 154 may also attach to the top of the chamber 156 by screwing onto the top of the chamber 156. The cap 154 may be made of a variety of different materials without departing from this invention, such as: polyethylene, polypropylene, or polyethylene or polypropylene closures with internal liners containing oxygen scavengers like: components of Hyguard™, Celox™, etc.

In an additional example in accordance with this invention, the cap 154 may include a foil retainer 166. The foil retainer 166 may be in the shape of a disc located in the center of the cap 154. The foil retainer 166 may include cut-out portions 168, thereby creating flaps or retaining portions 170 on the foil retainer 166 that may break-away with pressure. These flaps 170 are designed to cooperate specifically with the opening structure 140 as described above. When the opening structure 140 is pressed against the flaps 170 and the flaps 170 are pressed open, the flaps 170 may pierce the cover 160 and fold into the pod 152, thereby holding the pierced and cut portions of the cover 160 open so that the contents of the cartridge 150 can mix freely with the contents of the container 110. As illustrated in FIG. 3A, the cut-out portion 168 may be in the shape of a cross, thereby creating four triangular flaps 170. In other examples in accordance with this invention, the foil retainers 166A-166H may include cut-out portions 168 and flaps 170 in the shapes as illustrated in FIG. 3B. Additional shapes may be used for the cut-out portions 168 and flaps 170 without departing from this invention. When the foil retainer 166 is used with the cap 154, the cover 160 may be used or it may not be used. The foil retainer 166 may be made of a variety of different materials without departing from this invention, such as: polyethylene, polypropylene, or polyethylene or polypropylene closures with internal liners containing oxygen scavengers like: components of Hyguard™, Celox™, or any other material which is flexible enough to break when pressure is applied from the opening structure 140, and hard enough to cut or pierce the cover 160 and remain in place, thereby keeping the cover 160 open. As shown in FIGS. 3C and 3D, the cartridge 150 may include no cover 160 with a cap 154 or the cartridge 150 may include a cover 160 with no cap 154.

In an additional example in accordance with this invention, the cap 154 may include a locating portion 172. The locating portion 172, as illustrated on FIG. 3A, engages with the engagement assembly 122 to properly position the cartridge 150 within the attachment mechanism 120.

The pod 152 may be made of various materials without departing from this invention. For example, the pod 152 may be made of polyethylene terephthalate (PET). Additionally, the pod 152 may be made of PET in combination (by mixing and/or by using multi-layer structures) with passive barrier materials and/or oxygen scavengers like: plasma-applied coatings of SiOx or amorphous carbon, polyamides, polyglycolic acid, Amosorb™, DiamondClear™, or components of Hyguard™. Additionally, the pod 152 may be made of polyethylene or polypropylene in combination (by mixing and/or by using multilayer structures) with passive barrier materials and/or oxygen scavengers like: polyamides, ethylene vinyl alcohol. Additionally, the pod 152 may be made of aluminum. Other materials may be used for the pod 152 in accordance with this invention, such that the material alone or in combination with a barrier system protects some beverages or other products that are oxygen sensitive and to avoid excessive loss of water.

Figure 4C:
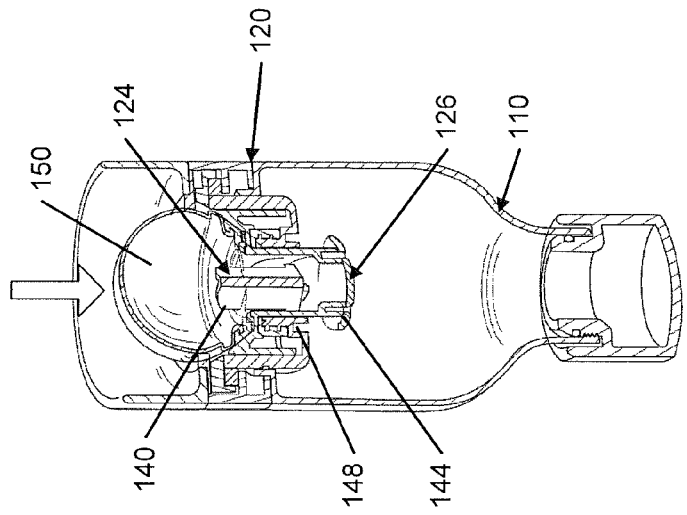
FIGS. 4A through 4F illustrate perspective views the operation of the beverage dispensing system from FIG. 1 in accordance with the present invention.
Figure 4B:
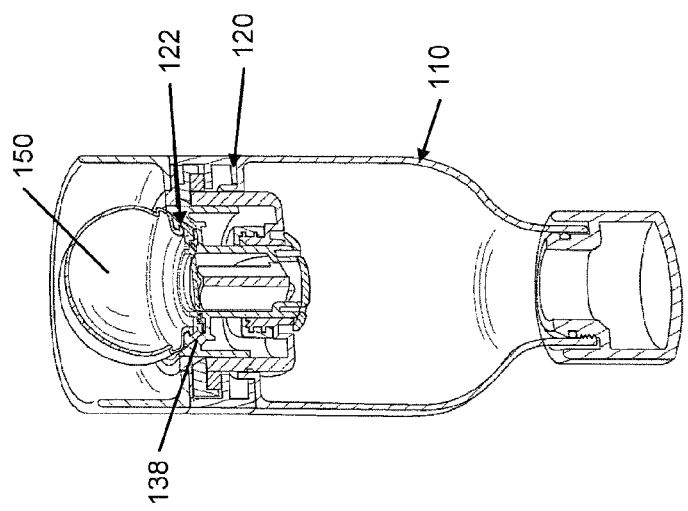
Figure 4A:
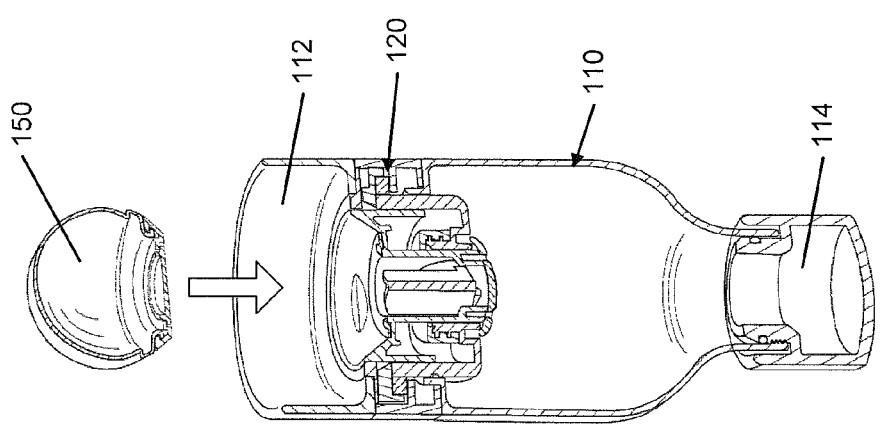
Figure 4F:
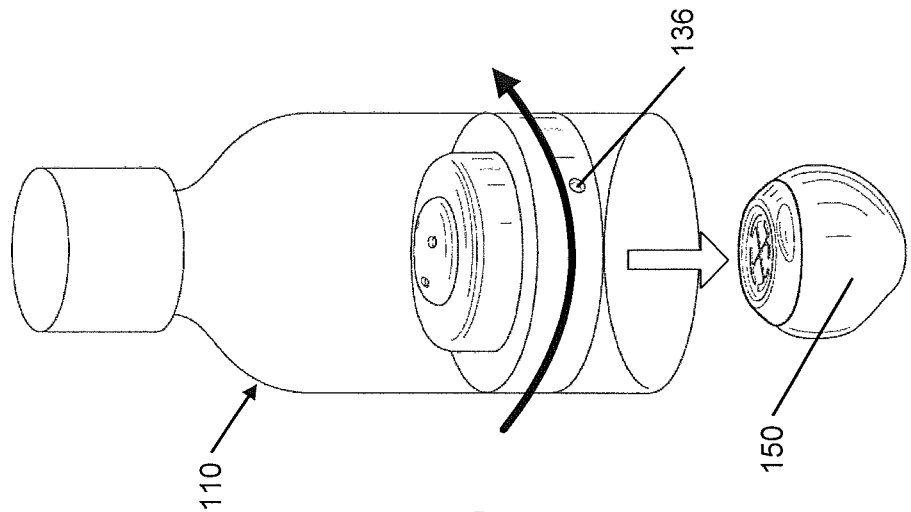

FIGS. 4A through 4F illustrate the operation of the beverage dispensing system according to examples of this invention. The preparation of the beverage dispensing system 100 as described above is shown in FIGS. 4A-4F. As shown in FIG. 4A, the cartridge 150 is inserted into the attachment mechanism 120 as located in the base of the container 110. The cartridge 150 may be inserted with the cap towards the attachment mechanism 120.

As shown in FIG. 4B, the cartridge 150 may be rotated to make sure the cartridge 150 is located in the proper location. The locating portion 172 located on the cap, engages with the engagement assembly 122 to properly position the cartridge 150 within the attachment mechanism 120. Additionally, the cartridge sealing portion 138 seals the area around the top of the cartridge 150 to the engagement assembly 122 when the cartridge 150 is inserted into the attachment mechanism 120. The cartridge sealing portion 138 ensures that the liquid or solution is contained within the cartridge 150 during the mixing process.

As shown in FIG. 4C, the cartridge 150 may be pressed into the attachment mechanism 120, thereby engaging the engagement assembly 122 and pressing the cartridge 150 into the locked position. As the cartridge 150 is engaged with the engagement assembly 122, the opening structure 140 of the piercing portion 124 pierces the opening and the cover 160 on the pod 152, thereby releasing the contents of the cartridge 150 into the container 110. Additionally, as the cartridge 150 is engaged with the engagement assembly 122, the valve assembly 126 is engaged and the valve sealing portion 148 is released from the container 110. The valve 144 opens into the container 110. As the opening 158 and cover 160 are pierced and the valve 144 opens, the contents of the container 110 and the contents of the cartridge 150 are now able to be mixed together.

Figure 4E:
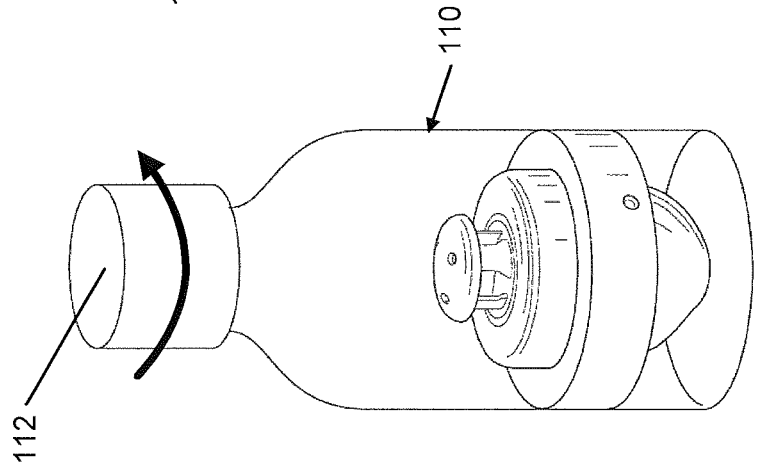
Figure 4D:
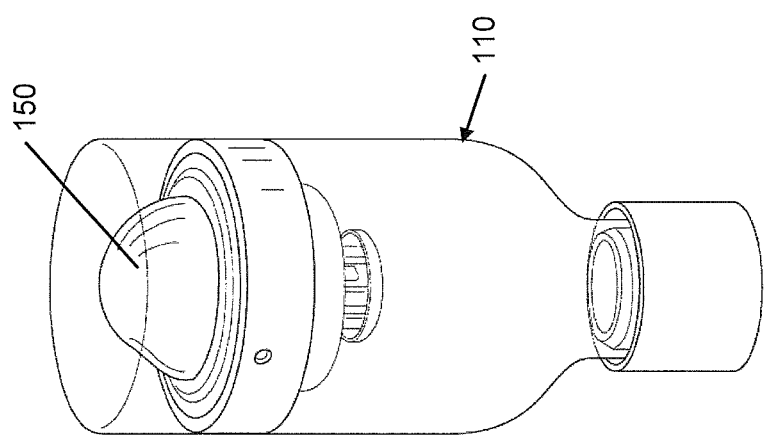

As shown in FIG. 4D, the container 110 may be rotated or shaken to mix the contents of the container 110 and the contents of the cartridge 150. This shaking movement causes the contents to mix together, thereby creating a desired beverage. As shown in FIG. 4E, the beverage is now ready to be consumed.

Once the beverage is consumed by the user, the cartridge 150 can be released from the attachment mechanism 120 by using the releasing mechanism 136. As shown in FIG. 4F, the releasing mechanism 136 is a rotating bezel, which ejects the cartridge 150 and returns the attachment mechanism 120 to the starting position. The releasing mechanism 136 may also be in the form of a release button or a release lever as explained above.

In accordance with this invention, a beverage apparatus or machine may perform the same operation as the container 110 as described above (apparatus not shown). The beverage apparatus may include an attachment mechanism 120 similar to as described above, wherein the cartridge 150 may be inserted into the attachment mechanism 120. Additionally, a glass or cup may be placed under or within the beverage apparatus to hold the desired beverage.

After the cartridge 150 is inserted into the attachment mechanism 120 of the beverage apparatus, the cartridge 150 may then be pressed into the attachment mechanism 120, thereby pressing the cartridge 150 into the locked position. As the cartridge 150 engages the attachment mechanism, the opening structure 140 pierces the cover 160 on the cartridge 150, thereby releasing the contents of the cartridge 150 into the container 110. As the cover 160 is pierced, a metered amount of water or other liquid from a first source may flush through the cartridge 150. Additionally, a metered amount of water or other liquid from a second source may be flushed directly into the glass. These first and second flushes help to ensure the contents of the cartridge 150 are completely emptied into the glass and that the contents of the cartridge 150 and the water or other liquid are completely mixed as required.

Additionally, the beverage apparatus may have a mechanical means to rotate or shake the glass to assist with mixing the contents of the container 110 and the contents of the cartridge 150. This shaking movement may cause the contents to mix together, thereby creating the desired beverage. Once the beverage is consumed by the user, the cartridge 150 can be removed from the beverage apparatus.

FIGS. 5A-8B illustrate additional container configuration according to examples of this invention.

Figure 5B:
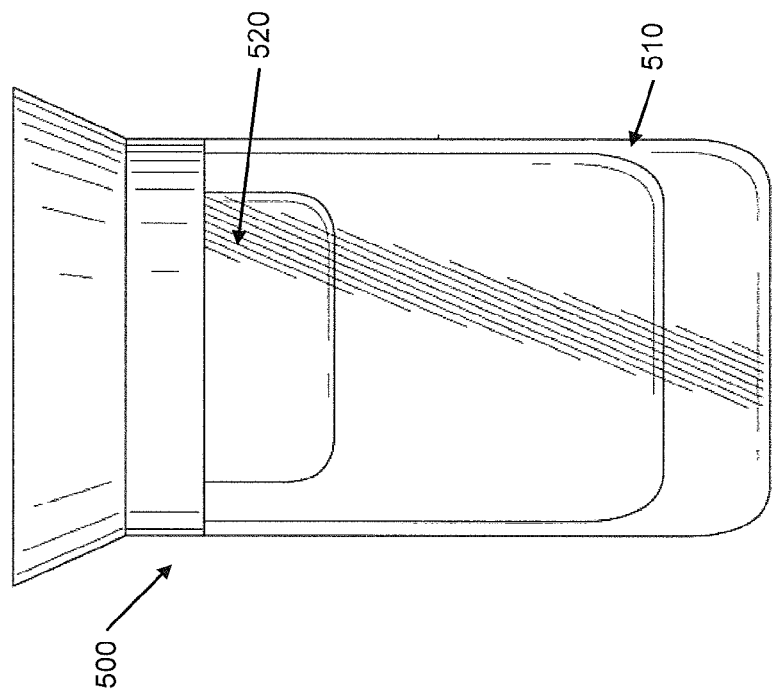
FIGS. 5A through 8B illustrate various examples of a container for a beverage dispensing system in accordance with the present invention.
Figure 5A:
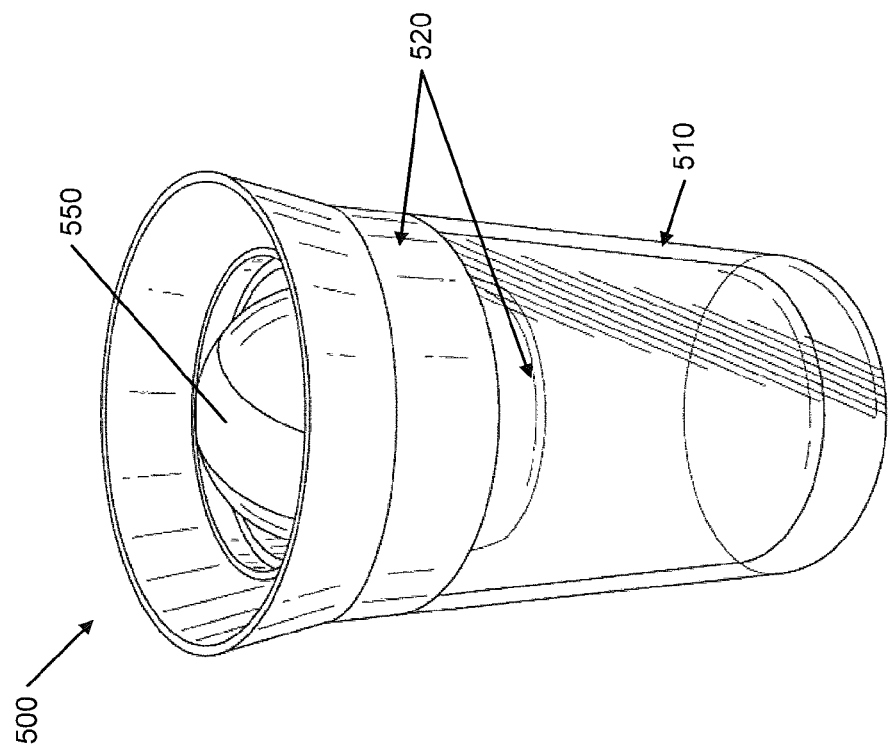

FIGS. 5A and 5B illustrate a beverage dispensing system 500 with a cartridge 550 located at the top of the container 510. FIGS. 5A and 5B illustrate an example according to this invention similar to that described above in conjunction with FIGS. 1 through 4F (the same or similar reference numbers are used in FIGS. 5A and 5B as those used in FIGS. 1 through 4F to denote the same or similar parts). In another example in accordance with this invention, as shown in FIG. 5A, the beverage dispensing system 500 is generally comprised of a container 510, an attachment mechanism 520, and a cartridge 550. The container 510 may hold a mixing solution or liquid, such as water, to be mixed with the contents of the cartridge 550. The cartridge 550 generally engages with the attachment mechanism 520 to open the cartridge 550 to be dispensed into the container 510, thereby combining the contents of the cartridge 550 with the liquid within the container 510 to create a drinkable beverage.

In this example configuration, the attachment mechanism 520 is located at the top of the container 510, such that the cartridge 550 is inserted into the attachment mechanism 520 at the top of the container 510. Additionally, the container 510 may include an area located around the cartridge 550, such that when the cartridge 550 is attached to the container 510, the user can drink from the container 510. The container 510 may include an open area around the cartridge 550 for drinking. Additionally, a release mechanism may be located on a side of the container 510. The release mechanism may be in the form of a release button or a release lever, wherein the user may press the release button or slide the release lever to release the cartridge. The attachment mechanism 520 and the cartridge 550 may be any of the configurations as described in this application without departing from the invention.

Figure 6B:
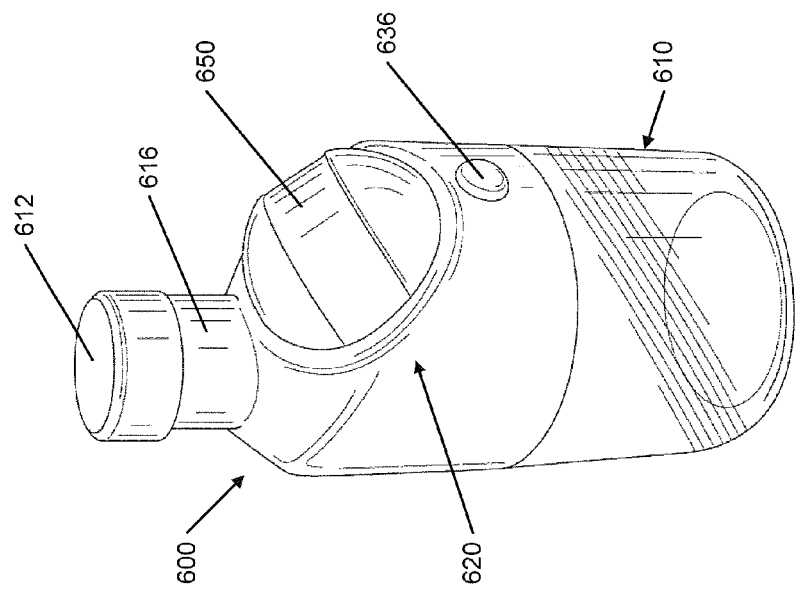
Figure 6A:
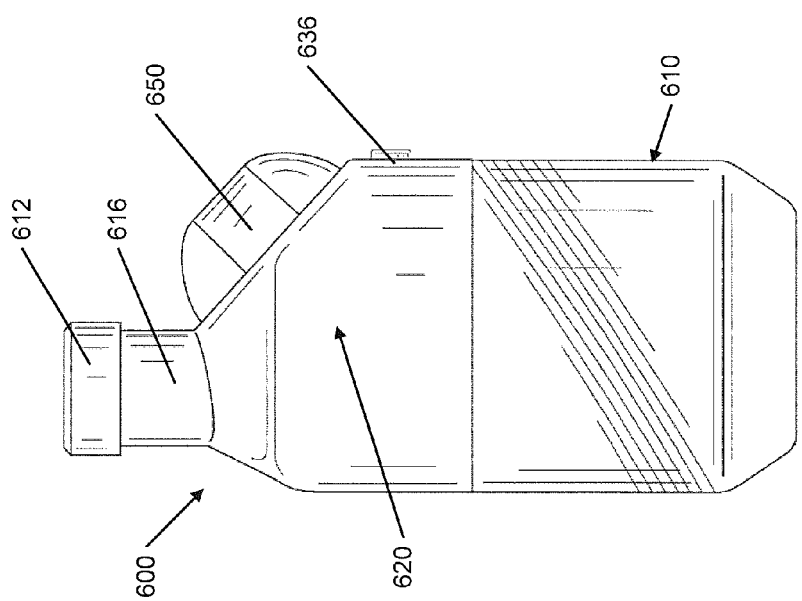

FIGS. 6A and 6B illustrate a beverage dispensing system 600 with a cartridge 650 located at the top of the container 610 at an angle. FIGS. 6A and 6B illustrate an example according to this invention similar to that described above in conjunction with FIGS. 1 through 4F (the same or similar reference numbers are used in FIGS. 6A and 6B as those used in FIGS. 1 through 4F to denote the same or similar parts). In another example in accordance with this invention, as shown in FIGS. 6A and 6B, the beverage dispensing system 600 is generally comprised of a container 610, an attachment mechanism 620, and a cartridge 650. The container 610 may hold a mixing solution or liquid, such as water, to be mixed with the contents of the cartridge 650. The cartridge 650 generally engages with the attachment mechanism 620 to open the cartridge 650 to be dispensed into the container 610, thereby combining the contents of the cartridge 650 with the liquid within the container 610 to create a drinkable beverage.

In this example configuration, the attachment mechanism 620 is located at the top of the container 610 at an angle, such that the cartridge 650 is inserted into the attachment mechanism 620 at the top angle of the container 610. Additionally, the container 610 may include a drinking spout 616 located adjacent to the cartridge 650, such that when the cartridge 650 is attached to the container 610, the user can drink from the container 610 out of the drinking spout 616. Additionally, a release mechanism 636 may be located on a side of the container 610. The release mechanism 636 may be in the form of a release button or a release lever, wherein the user may press the release button or slide the release lever to release the cartridge 650. The attachment mechanism 620 and the cartridge 650 may be any of the configurations as described in this application without departing from the invention.

Figure 7B:
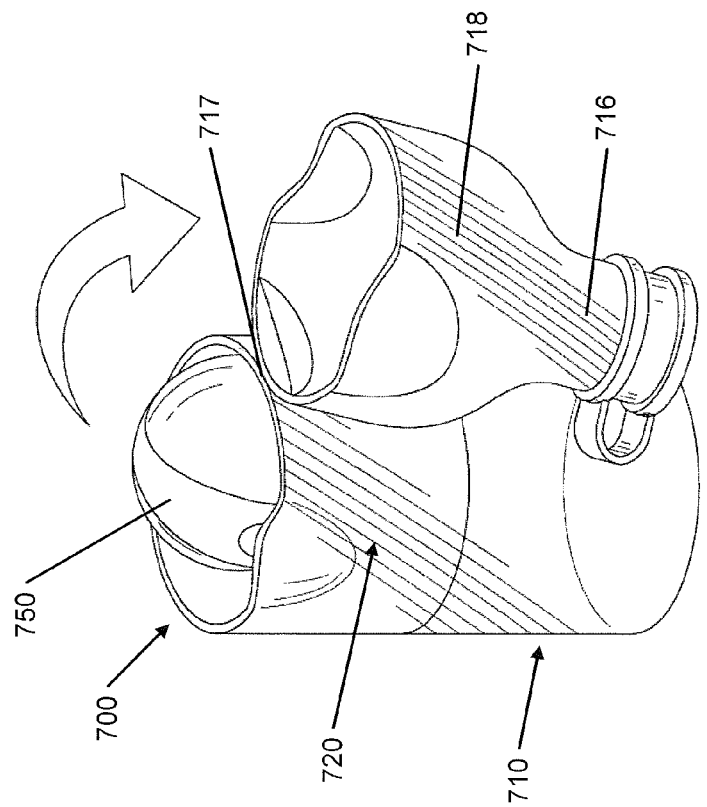
Figure 7A:
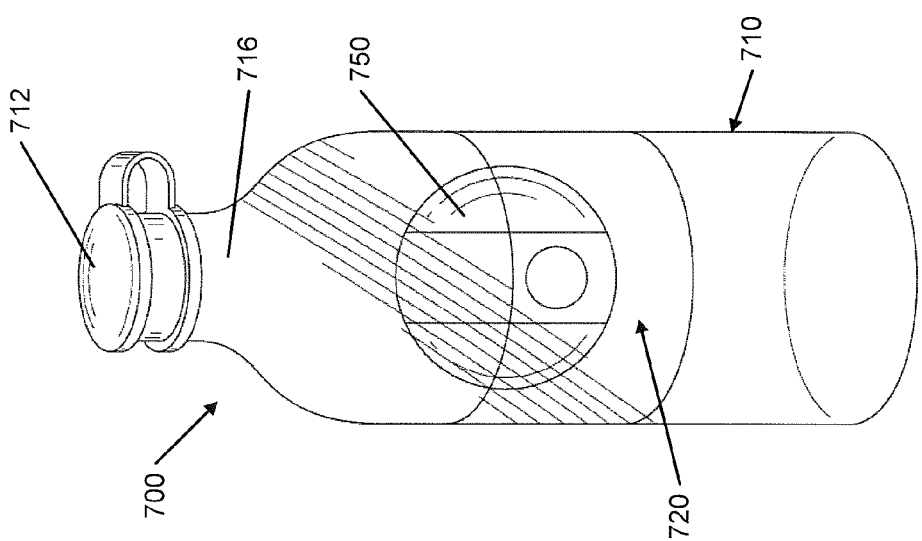

FIGS. 7A and 7B illustrate a beverage dispensing system 700 with a container 710 with a hinge 717 and a cartridge 750 located in middle of the container 710. FIGS. 7A and 7B illustrate an example according to this invention similar to that described above in conjunction with FIGS. 1 through 4F (the same or similar reference numbers are used in FIGS. 7A and 7B as those used in FIGS. 1 through 4F to denote the same or similar parts). In another example in accordance with this invention, as shown in FIGS. 7A and 7B, the beverage dispensing system 700 is generally comprised of a container 710, an attachment mechanism 720, and a cartridge 750. The container 710 may hold a mixing solution or liquid, such as water, to be mixed with the contents of the cartridge. The cartridge generally engages with the attachment mechanism to open the cartridge 750 to be dispensed into the container 710, thereby combining the contents of the cartridge 750 with the liquid within the container 710 to create a drinkable beverage.

In this example configuration, the container 710 may have a hinged portion 717, such as a top portion 718 of the container 710, wherein the top portion 718 swings to an open position, as illustrated in FIG. 7B. When the top portion 718 is in the open position, the cartridge 750 can be inserted into the attachment mechanism 720. The attachment mechanism 720 may be located in the middle area of the container 710, such that the cartridge 750 is inserted into the attachment mechanism 720 when the top portion 718 is in the open position. After the cartridge 750 is inserted, the top portion 718 may swing back to a closed position, as illustrated in FIG. 7A. When the top portion 718 is in the closed position, the beverage may be mixed and the user may drink from the container 710. Additionally, the container 710 may include a drinking spout 716 located at the top of the container 710. Additionally, a release mechanism may be located on a side of the container 710. The release mechanism may be in the form of a release button or a release lever, wherein the user may press the release button or slide the release lever to release the cartridge 750. The attachment mechanism 720 and the cartridge 750 may be any of the configurations as described in this application without departing from the invention.

Figure 8B:
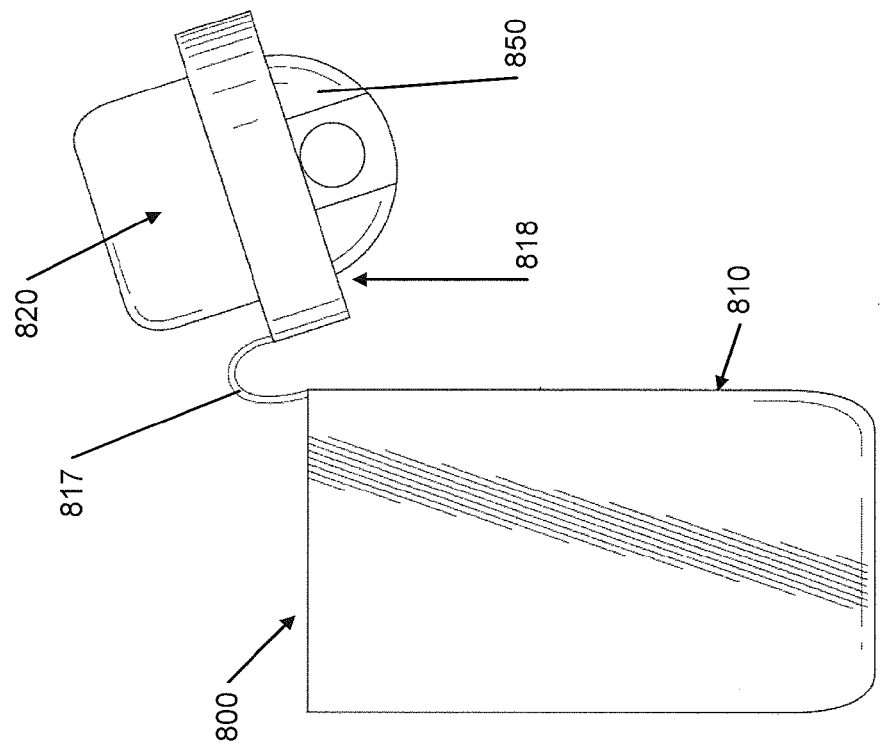
Figure 8A:
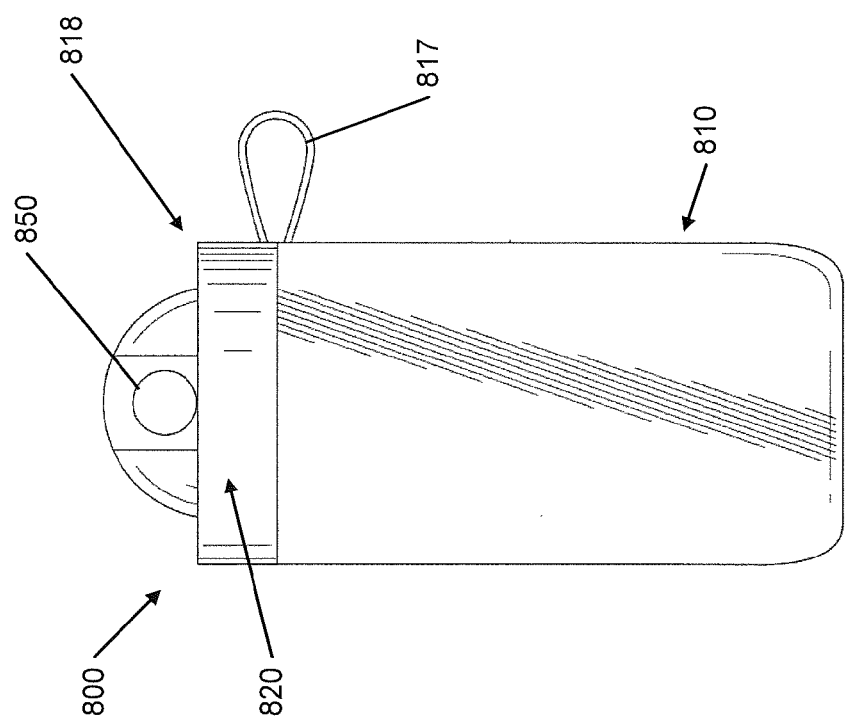

FIGS. 8A and 8B illustrate a beverage dispensing system 800 with a container 810 with a hinge 817 and a cartridge 850 located in the hinged portion 818 of the container 810. FIGS. 8A and 8B illustrate an example according to this invention similar to that described above in conjunction with FIGS. 1 through 4F (the same or similar reference numbers are used in FIGS. 8A and 8B as those used in FIGS. 1 through 4F to denote the same or similar parts). In another example in accordance with this invention, as shown in FIGS. 8A and 8B, the beverage dispensing system 800 is generally comprised of a container 810, an attachment mechanism 820, and a cartridge 850. The container 810 may hold a mixing solution or liquid, such as water, to be mixed with the contents of the cartridge 850. The cartridge 850 generally engages with the attachment mechanism 820 to open the cartridge 850 to be dispensed into the container 810, thereby combining the contents of the cartridge 850 with the liquid within the container 810 to create a drinkable beverage.

In this example configuration, the container 810 may have a hinged portion 817, such as a lid 818 on the container 810, wherein the lid 818 swings to an open position, as illustrated in FIG. 8B. The lid 818 may include the attachment mechanism 820 located at the top of the container 810. The cartridge 850 may be inserted into the attachment mechanism 820 when the lid 818 is in the open position. After the cartridge 850 is inserted, the lid 818 may swing back to a closed position, as illustrated in FIG. 8A. When the lid 818 is in the closed position, the beverage may be mixed and the user may drink from the container 810. Additionally, the container 810 may include a drinking area located at the top of the container 810 around the cartridge 850. Additionally, a user may drink from the container 810 when the lid 818 is in the open position. A release mechanism may be located on a top side of the container 810. The release mechanism may be in the form of a release button or a release lever, wherein the user may press the release button or slide the release lever to release the cartridge 850. The attachment mechanism 820 and the cartridge 850 may be any of the configurations as described in this application without departing from the invention.

Additional container configurations may be utilized without departing from this invention. Containers such as: multi-serve containers which may hold multiple cartridges or bigger cartridges; containers to hold liquid food, such as soup; containers which can used as a glass by removing the upper portion which contains the attachment mechanism; containers for use in a car or in a sports environment which may have a sports closure, such as a push/pull drinking spout; containers for use in airline flights such that the cartridges and water are used to supply drinks to the passengers; containers which may contain medicated drinks such as an aspirin or prescription drugs; containers which may fit within a refrigerator that has a tap dispenser and a top that contains the attachment mechanism; containers that may be hand-held; and containers which are much larger that may be located on a counter or shelf, either in a store environment or in a home, to name a few. Again, the teachings and principles of the invention may be applied to any container configuration without departing from the invention.

FIGS. 9A through 13B illustrate additional attachment mechanism configurations according to examples of this invention.

Figure 9A:
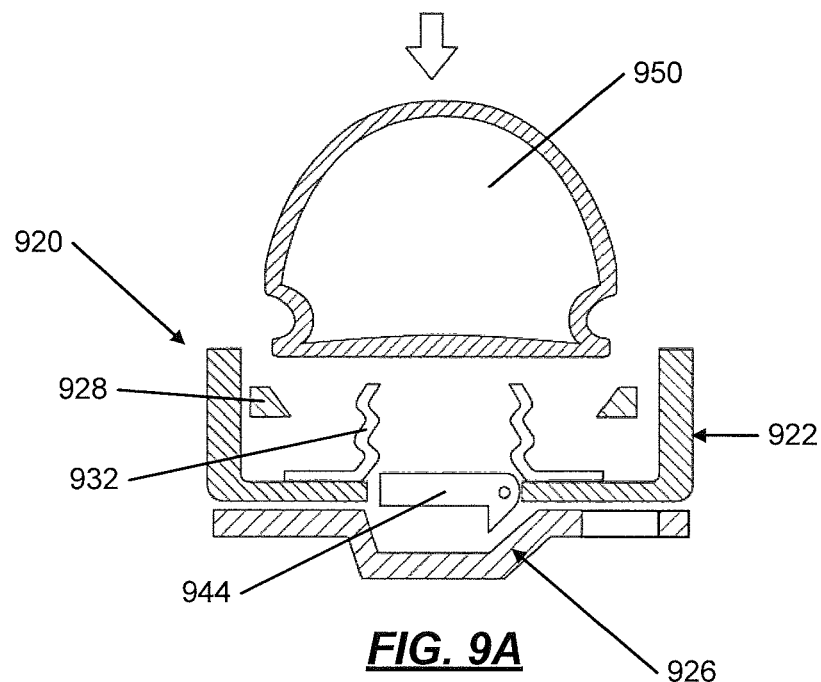
Figure 9B:
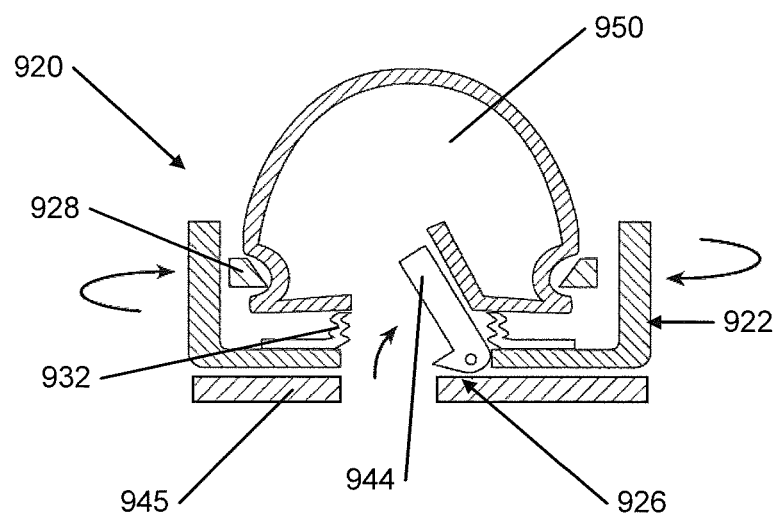

FIGS. 9A and 9B illustrate an attachment mechanism 920 with a paddle-type valve assembly 926. FIGS. 9A and 9B illustrate an example according to this invention similar to that described above in conjunction with FIGS. 1 through 4F (the same or similar reference numbers are used in FIGS. 9A and 9B as those used in FIGS. 1 through 4F to denote the same or similar parts). In another example in accordance with this invention, as shown in FIGS. 9A and 9B, the attachment mechanism 920 is generally comprised of an engagement assembly 922, a piercing portion 924, and a valve assembly 926. The engagement assembly 922 may generally receive the cartridge 950 within the attachment mechanism 920. The piercing portion 924 may generally pierce the cartridge 950, thereby releasing the contents of the cartridge 950 into the container 910. The valve assembly 926 may generally open upon engagement of the cartridge 950 with the attachment mechanism 920 thereby allowing the mixing of the contents of the container 910 with the contents of the cartridge 950.

In this example configuration, the attachment mechanism 920 requires a two-part action to attach the cartridge 950 and open the cartridge 950. First, as shown in FIG. 9A, the cartridge 950 is attached to the engagement assembly 922, wherein the engagement assembly 922 includes a latching structure 928 and a spring 932 to hold the cartridge 950 in a locked position. Once the cartridge 950 is in a locked position, as shown in FIG. 9B, the engagement assembly 922 may be twisted. As the engagement assembly 922 is twisted, the twisting action causes a cam 945 within the valve assembly 926 to rotate a valve 944 in the valve assembly 926 upward into the opening of the cartridge 950, thereby piercing the cover 960. With the valve 944 rotating upward, the valve 944 may also, simultaneously, open the container 910 to the cartridge 950 so that the contents of the container 910 and the contents of the cartridge 950 can mix. The container 910 and cartridges 950 may be any of the configurations as described in this application without departing from the invention.

As illustrated in FIGS. 10A and 10B, in a similar configuration to the paddle-type valve assembly 1026 as described above, the attachment mechanism 1020 may be rotated to uncover a hole or a plurality of holes 1021, 1023 if more than one cartridge is used. As shown in FIGS. 10A and 10B, two cartridges 1050A, 1050B are attached to the attachment mechanism 1020 with two holes 1021, 1023 located in the attachment mechanism 1020. The rotation of the attachment mechanism 1020 may enable the mixing of the contents of the container 1010 with the contents of the pod or pods 1050A, 1050B. The attachment mechanism 1020, the container 1010, and the cartridges 1050A, 1050B may be any of the configurations as described in this application without departing from the invention.

Figure 11A:
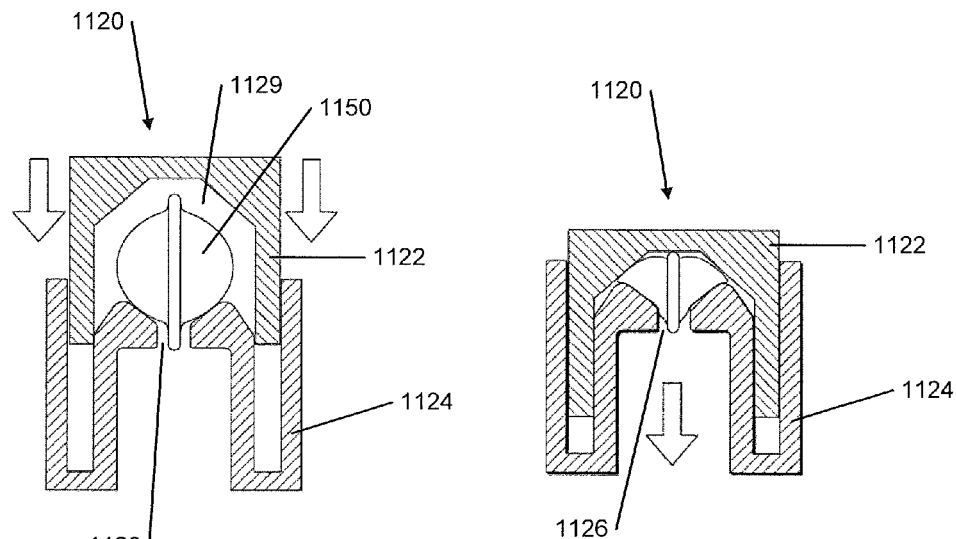
Figure 11B:
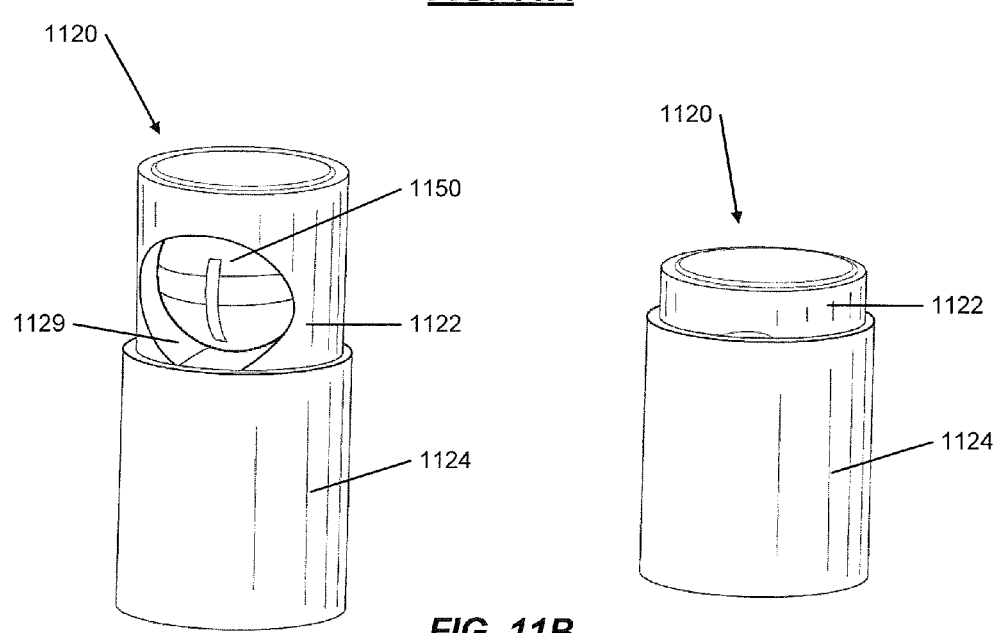

FIGS. 11A and 11B illustrate an attachment mechanism with a piston-type attachment mechanism 1120. FIGS. 11A and 11B illustrate an example according to this invention similar to that described above in conjunction with FIGS. 1 through 4F (the same or similar reference numbers are used in FIGS. 11A and 11B as those used in FIGS. 1 through 4F to denote the same or similar parts). In another example in accordance with this invention, as shown in FIGS. 11A and 11B, the attachment mechanism 1120 is generally comprised of an engagement assembly, a crushing portion, and a valve assembly. The engagement assembly may generally receive the cartridge 1150 within the attachment mechanism. The crushing portion may generally open the cartridge 1150, thereby releasing the contents of the cartridge 1150 into the container. The valve assembly may generally open upon engagement of the cartridge 1150 with the attachment mechanism 1120 thereby allowing the mixing of the contents of the container with the contents of the cartridge 1150.

In this example configuration, the engagement assembly may include a piston 1122. The attachment mechanism may also include a base 1124 wherein the crushing portion and the valve assembly may be contained. A cartridge 1150 is placed within an opening 1129 in the piston 1122, wherein the opening 1129 is located on the side of the piston 1122. The piston 1122 may then be pushed such that the cartridge 1150 is crushed or squeezed against the base 1124. As the piston 1122 is moved against the base 1124, a valve 1126 opens to the container, thereby allowing the contents of the container and the contents of the cartridge to mix. Additionally, as the piston 1122 is moved against the base 1124, the cartridge 1150 is crushed or squeezed, thereby causing the cover 1160 to open and discharge the contents of the cartridge 1150 into the container. The container and the cartridge 1150 may be any of the configurations as described in this application without departing from the invention.

Figure 12A:
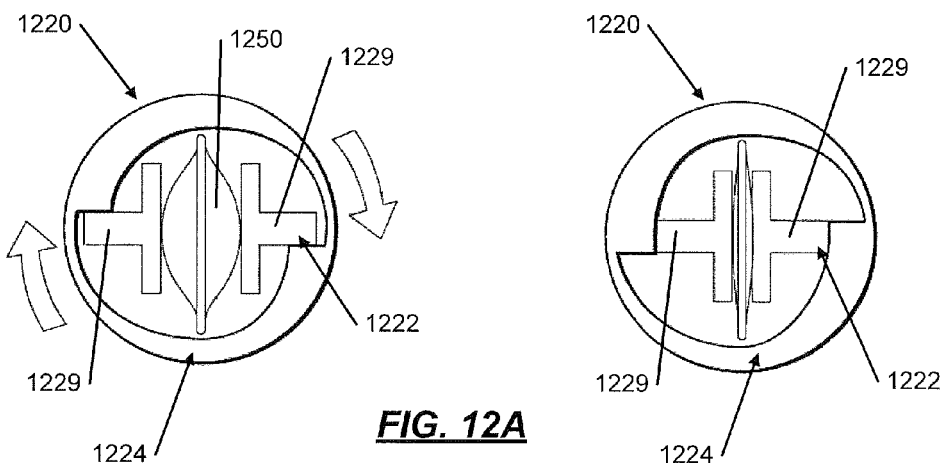
Figure 12B:
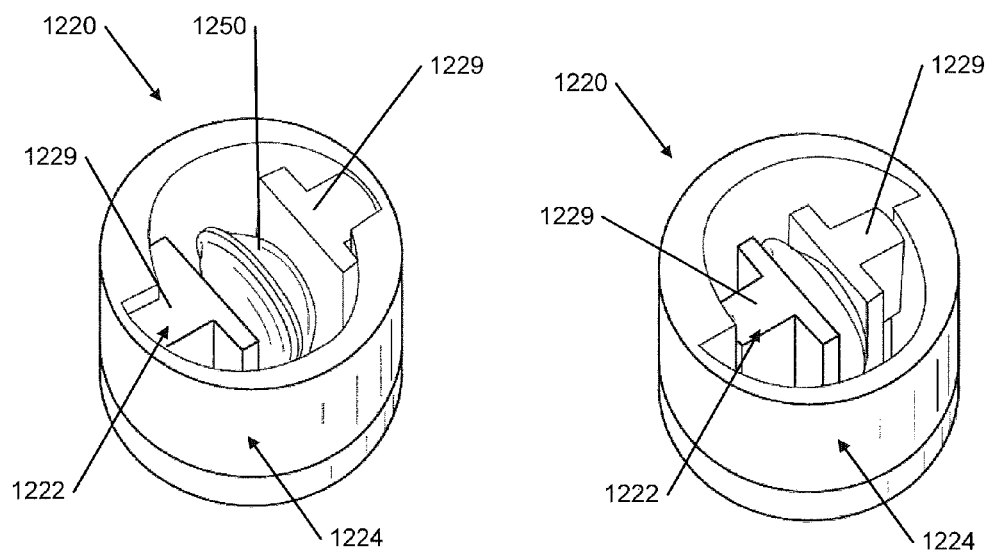

FIGS. 12A and 12B illustrate an attachment mechanism with a rotating cam type attachment mechanism 1220. FIGS. 12A and 12B illustrate an example according to this invention similar to that described above in conjunction with FIGS. 1 through 4F (the same or similar reference numbers are used in FIGS. 12A and 12B as those used in FIGS. 1 through 4F to denote the same or similar parts). In another example in accordance with this invention, as shown in FIGS. 12A and 12B, the attachment mechanism 1220 is generally comprised of an engagement assembly, a crushing portion, and a valve assembly. The engagement assembly may generally receive the cartridge 1250 within the attachment mechanism. The crushing portion may generally open the cartridge, thereby releasing the contents of the cartridge 1250 into the container. The valve assembly may generally open upon engagement of the cartridge 1250 with the attachment mechanism 1220 thereby allowing the mixing of the contents of the container with the contents of the cartridge 1250.

In this example configuration, the engagement assembly may include a cam assembly 1222 and a base 1224. The cam assembly 1222 may also include two cams 1229. The cartridge 1250 may be inserted in between the two cams 1229 through the top of the attachment mechanism 1220. The two cams 1229 may be attached to the cam assembly 1222, such that as the base 1224 and cam assembly 1222 is rotated, the cams 1229 press inward. As the cams 1229 press inward the cams 1229 crush or squeeze the cartridge 1250 within the cams 1229, thereby causing the cover of the cartridge 1250 to open and discharge the contents of the cartridge 1250 into the container. The container and the cartridge 1250 may be any of the configurations as described in this application without departing from the invention.

Figure 13A:
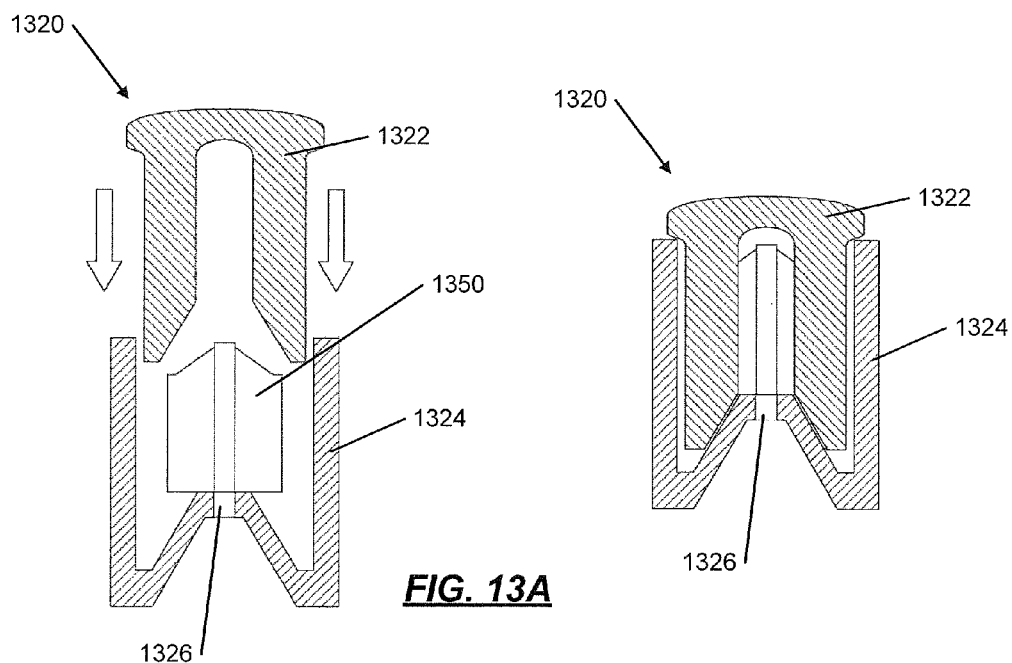
Figure 13B:
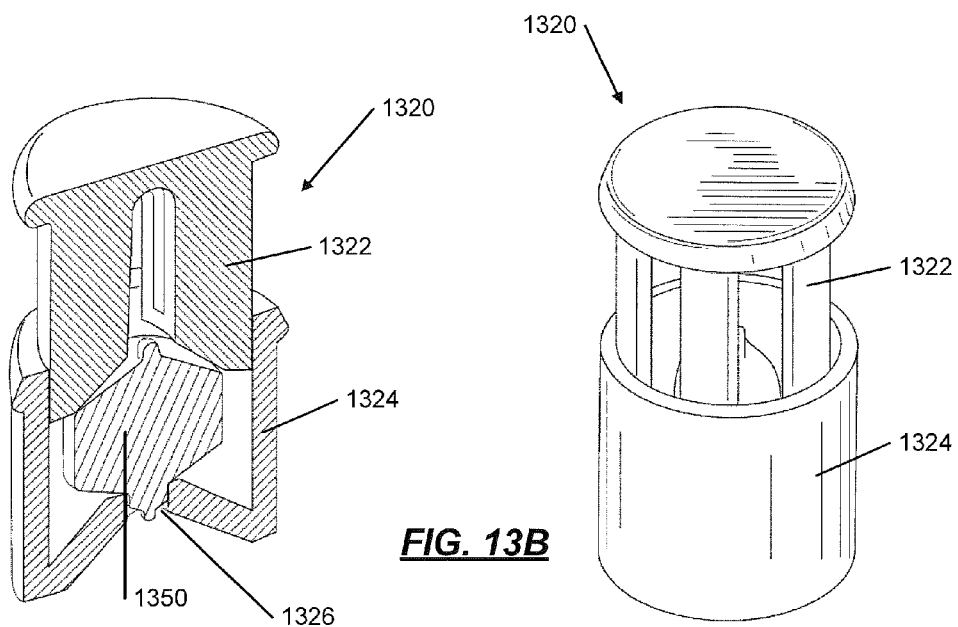

FIGS. 13A and 13B illustrate an attachment mechanism with a plunger-type attachment mechanism 1320. FIGS. 13A and 13B illustrate an example according to this invention similar to that described above in conjunction with FIGS. 1 through 4F (the same or similar reference numbers are used in FIGS. 13A and 13B as those used in FIGS. 1 through 4F to denote the same or similar parts). In another example in accordance with this invention, as shown in FIGS. 13A and 13B, the attachment mechanism 1320 is generally comprised of an engagement assembly, a crushing portion, and a valve assembly. The engagement assembly may generally receive the cartridge 1350 within the attachment mechanism. The crushing portion may generally open the cartridge 1350, thereby releasing the contents of the cartridge 1350 into the container. The valve assembly may generally open upon engagement of the cartridge 1350 with the attachment mechanism thereby allowing the mixing of the contents of the container with the contents of the cartridge 1350.

In this example configuration, the engagement assembly may include a plunger 1322. The attachment mechanism 1320 may also include a base 1324 wherein the crushing portion and the valve assembly may be contained. A cartridge 1350 is placed in the top of the base 1324. The plunger 1322 may then be pushed such that the cartridge 1350 is crushed or squeezed between the plunger 1322 and the base 1324 of the attachment mechanism 1320. As the plunger 1322 is moved against the base 1324 of the attachment mechanism 1320, a valve 1326 may open to the container, thereby allowing the contents of the container and the contents of the cartridge 1350 to mix. As the plunger 1322 is moved against the base 1324 of the attachment mechanism 1320, the cartridge 1350 is crushed or squeezed, thereby causing the cover to open and discharge the contents of the cartridge 1350 into the container. Additionally, the plunger 1322 may contain a piercing needle (not shown) wherein the piercing needle pierces the cartridge 1350 as the plunger 1322 is pushed into the base 1324 of the attachment mechanism 1320. The container and the cartridge 1350 may be any of the configurations as described in this application without departing from the invention.

Additional attachment mechanisms may be utilized without departing from this invention. Attachment mechanism such as: threaded connections between the container and the attachment mechanism instead of the snap feature as described above; quarter-turn connections between the container and the attachment mechanism instead of the snap feature as described above; a hand-tool 240 similar to a nutcracker which holds a cartridge and can pierce and open the cartridge by use of the hand-tool 240 and thus pouring the contents of the cartridge into a glass 242 (as shown in FIG. 24).

FIGS. 14A through 14C illustrate additional cartridge configurations according to examples of this invention. As illustrated in FIGS. 14A through 14C, in another example cartridge configuration, the cartridge 1450 may be comprised of multiple pods. As illustrated in FIGS. 14A and 14B, the cartridge may comprise two half pods 1450A, 1450B, wherein each of the half pods 1450A, 1450B can be combined to make one singular pod 1450. The contents of each pod 1450A, 1450B may then be mixed with water or other liquid to form the desired beverage. Each half pod 1450A, 1450B may contain syrup, paste, powder, granules or other compositions that when mixed with water or other liquids will result in a beverage. In an alternative aspect of the invention, the half pod 1450A, 1450B may contain an energy boost, nutrients, or vitamin supplement that can be added to the beverage. The two half pods 1450A, 1450B may be inserted into an attachment mechanism 1420 located at the bottom of a container 1410 as shown in FIG. 14C. Alternatively, the cartridge 1450 may include three or more pods.

In another example cartridge configuration, the beverage dispensing system may include multiple attachment mechanisms, piercing portions, and valve assemblies, such that multiple cartridges may be inserted for a single container or beverage dispensing system. The contents of each cartridge may then be mixed with water or other liquids to form the desired beverage. Each cartridge may contain syrup, paste, powder, granules or other compositions that when mixed with water or other liquids will result in a beverage. In an alternative aspect of the invention, one or more of the cartridges may contain an energy boost or vitamin supplement that can be added to the beverage. Additionally, one or more of the cartridges may be a different size, such as smaller or larger, than the other cartridges.

In another example cartridge configuration, the cartridge may be comprised of multiple chambers each containing the same or different beverage-making component. Multiple chambers may be beneficial when there are unstable ingredients that must remain separate as part of the beverage. The contents of each chamber may then be mixed with water or other liquids to form the desired beverage. Each chamber may contain syrup, paste, powder, granules or other compositions that when mixed with water or other liquids will result in a beverage. In an alternative aspect of the invention, one of the chambers may contain an energy boost or vitamin supplement that can be added to the beverage.

Figure 15:
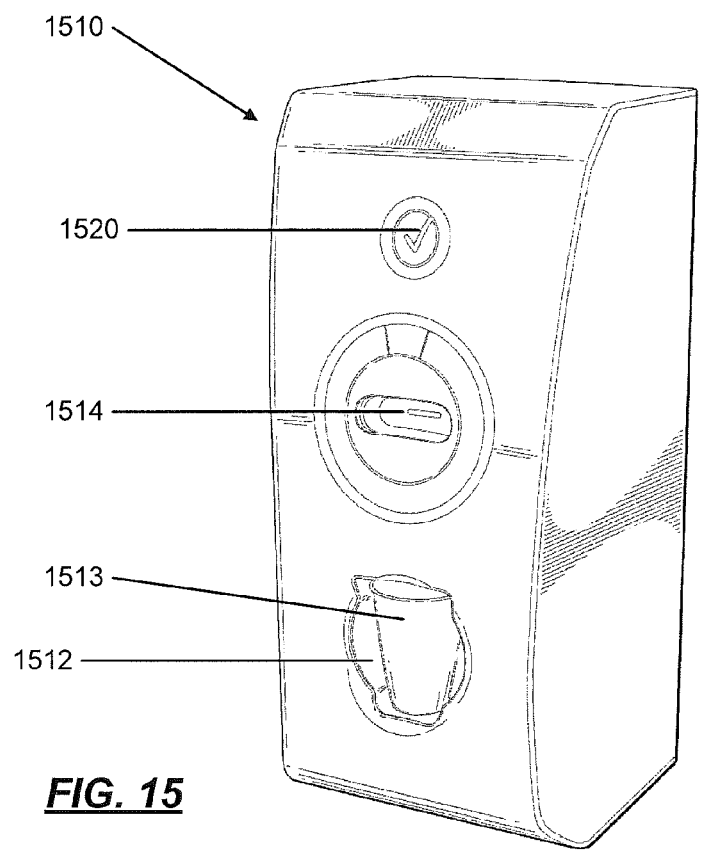
FIGS. 15 through 17 illustrate various examples of an alternative beverage system in accordance with the present invention.
Figure 16:
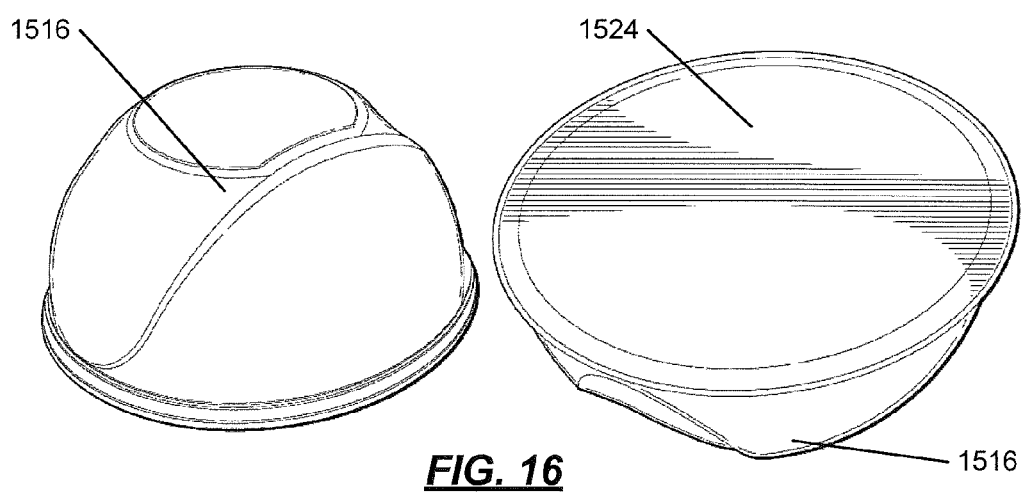
Figure 17:
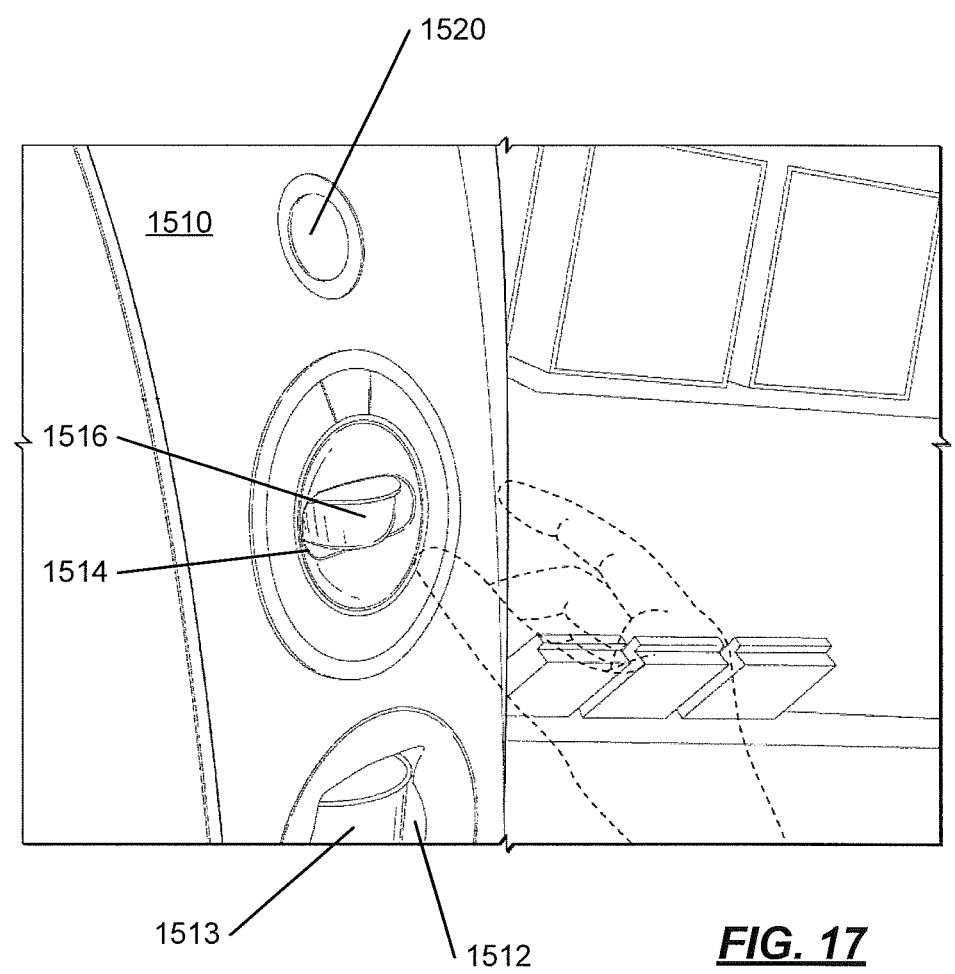

In another example in accordance with this invention, a beverage dispensing system is directed at a single-serve beverage dispensing system. The beverage dispensing system is directed to overcome the drawbacks and problems with existing beverage dispensing or delivery systems. A single-serve beverage dispensing system is disclosed in FIGS. 15-18C. As illustrated by FIGS. 15-18C, the single-serve beverage dispensing system dispenses a metered amount of water or other liquid through a syrup-containing cartridge having the proper amount of syrup to create a single-serve beverage, for example, a soft drink. As illustrated by FIGS. 15-17, the beverage dispensing system of the invention permits a consumer in a retail environment or at home to create a single-serve beverage by selecting a cartridge containing the desired beverage ingredients and placing the cartridge into the beverage dispensing system. The consumer then presses a button which activates the beverage mixing operation of the system. Once activated, a needle operatively connected to a water or other liquid supply will drop down and puncture the cartridge through the top and bottom of the cartridge. For a predetermined period of time, the needle will remain in and partially extending through the cartridge. While the needle is positioned in the cartridge, water or other liquids are directed to the needle and allowed to pass through an opening in the end of the needle and through a plurality of apertures positioned around the periphery of the needle. The water or other liquids passing through the plurality of apertures will enter the cartridge and mix with the syrup contained in the cartridge. Once mixed, the beverage will pass through the punctured opening created in the bottom of the cartridge and drop into a cup positioned beneath the cartridge. Water or other liquids will additionally flow out through the opening in the end of the needle to further create the proper consistency and flavor of the beverage. After the beverage has been dispensed into the cup, the consumer may remove the cup and enjoy the beverage. The used cartridge may then be discarded.

More specifically, and referring to FIGS. 15-17, in an exemplary embodiment, the beverage system 1508 includes a dispenser housing 1510 that includes openings 1512 and 1514 formed in the housing. Opening 1512 is sized and shaped to receive a beverage cup 1513 for receiving and containing the created beverage dispensed from the beverage system. Opening 1514 is sized and shaped to receive a cartridge 1516 that contains syrup, which is mixed with water or other liquids to make the beverage. The opening 1514 and cartridge 1516 define a mating configuration in that the cartridge 1516 is shaped to match the shape of the opening 1514, and vice versa. With this configuration, only cartridges having a shape that matches the shape of the opening 1514 can be inserted into the opening 1514, thereby preventing undesirable or non-matching cartridges or containers from being used with the beverage system. The beverage system further includes a button or switch 1520 that a consumer presses to activate the beverage system.

Figure 25:
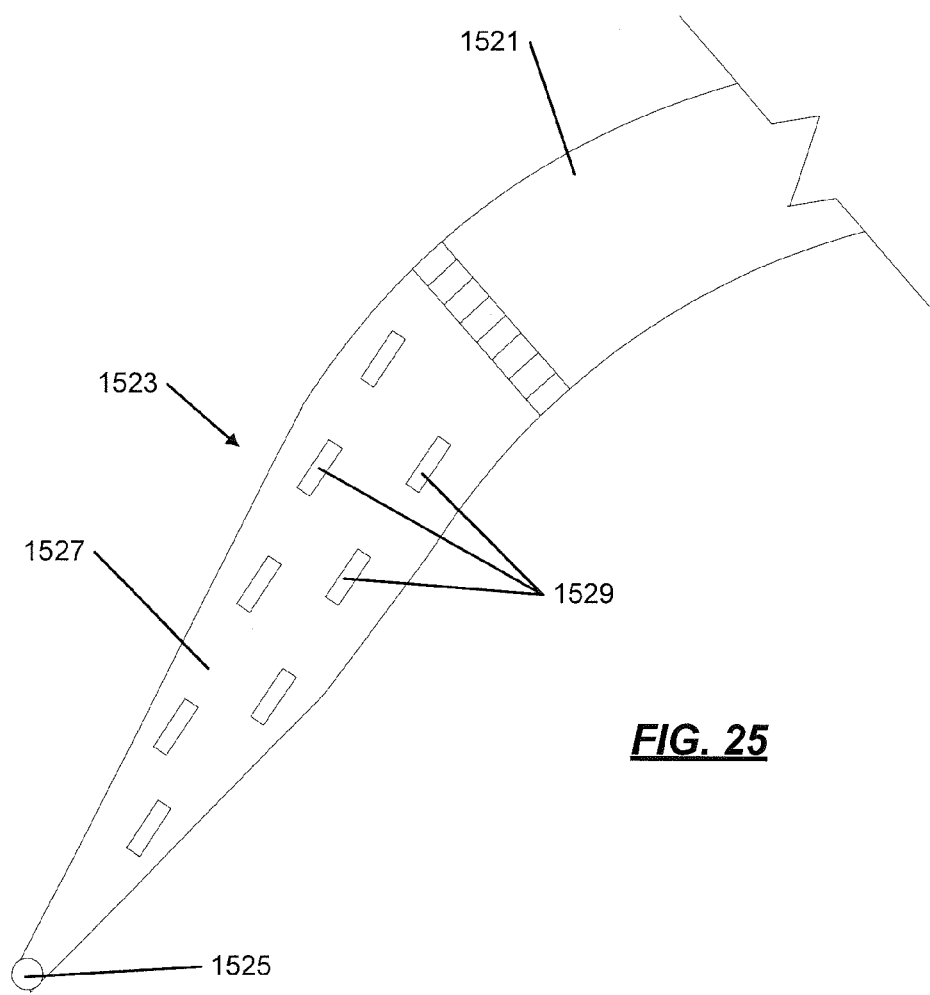
FIG. 25 illustrates an example needle to be used with the beverage system in FIGS. 15 through 17 in accordance with the present invention.

Positioned within the housing 1510 is a water (or other liquid) supply system that includes a water supply line 1521 operatively connected at one end to a water source, and at an opposing end to a needle 1523. The water (or other liquid) source may be either carbonated or non-carbonated water, or may be any other suitable liquid that can be mixed with the syrup contained within the cartridge. As illustrated in FIG. 25, the needle 1523 defines a pointed or sharp open end 1525 that as explained above is used to puncture the cartridge 1516. The needle 1523 further defines an elongated tube-like body 1527 that further defines a plurality of apertures 1529 positioned around the periphery of the tube body 1527 of the needle 1523. Once positioned within the cartridge 1516, the apertures 1529 permit water or other liquids traveling through the tube body 1527 to pass into the cartridge 1516 to mix with syrup contained with the cartridge 1516. As should be understood, the needle 1523 may define numerous other configurations that permit the puncturing of the cartridge 1516 and passing of water or other liquids into the cartridge 1516.

The cartridge 1516 may define a single chamber, or may define multiple chambers each containing the same or different beverage-making component. The contents of each chamber may then be mixed with water or other liquid to form the desired beverage. Each chamber may contain syrup, paste, powder, granules or other compositions that when mixed with water or other liquids will result in a beverage. In an alternative aspect of the invention, the cartridge may contain an energy boost or vitamin supplement that can be added to the beverage.

As illustrated in FIG. 16, the cartridge may define a dome-shaped configuration made of a plastic material. The dome shape creates the one or more chambers within the cartridge. Aluminum foil 1524 or a similar sealing material may be positioned across the cartridge to seal the contents within the cartridge. The aluminum foil may include product information or other indicia printed thereon, or may contain instructions as to how to use the cartridge and/or beverage system. The use of aluminum foil and plastic with the cartridge permits the needle to easily penetrate and puncture the foil and plastic. It should be understood that numerous other shapes and configurations of the cartridge are possible and that the depicted dome shape is merely exemplary of the numerous alternative configurations.

Figure 18A:
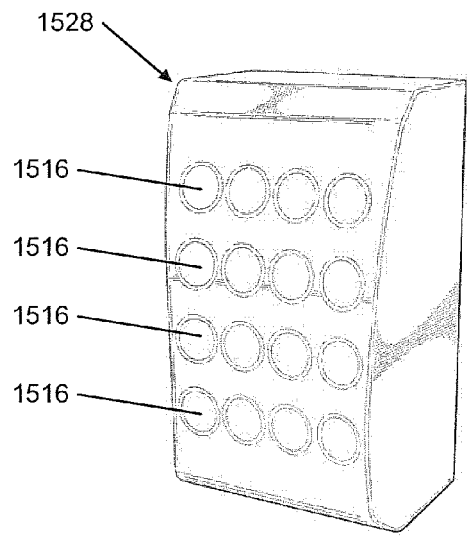
FIGS. 18A-18C illustrate an alternative example of a beverage system in accordance with the present invention.
Figure 18B:
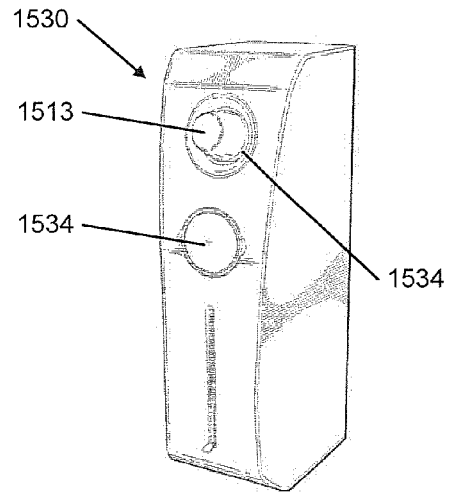
Figure 18C:
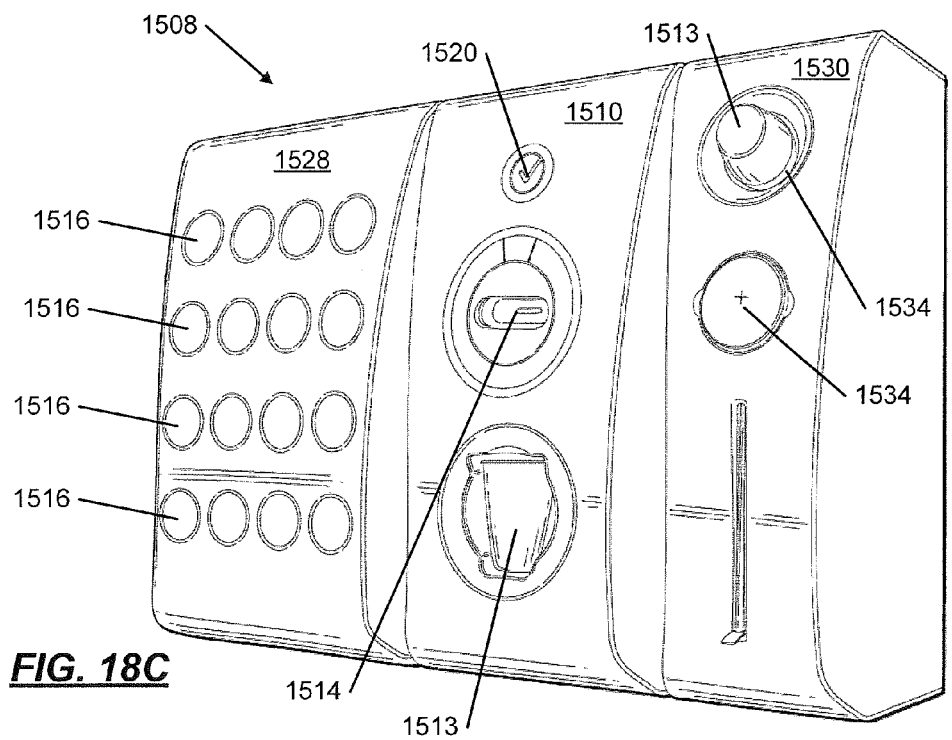

Referring to FIGS. 18A through 18C, the beverage system 1508 may also include a housing 1528 containing numerous cartridges each containing a different beverage flavor or ingredient giving the consumer numerous choices for a beverage, unlike the limited options with existing beverage systems. In one embodiment, the cartridges may be positioned in an array with the product information relating to the cartridge readily visible to the consumer, the array creating an aesthetically pleasing consumer impression. The housing may contain various eye-catching colors and advertisements to attract the attention of the consumers. The beverage system 1508 may also include a cup-holding housing 1530 that contains numerous stacked cups 1513 that are also readily accessible to a consumer. The housing 1530 may include one or more cup-holding openings 1534 to accommodate multiple sized cups. The beverage housings 1510, 1528 and 1530 are all modular to provide flexibility in placing the beverage system within a retail store environment to enhance the visibility of the system, and are sufficiently lightweight and compact to permit each to sit on top of a counter within the store, or at any other desired location within the store.

Figure 19:
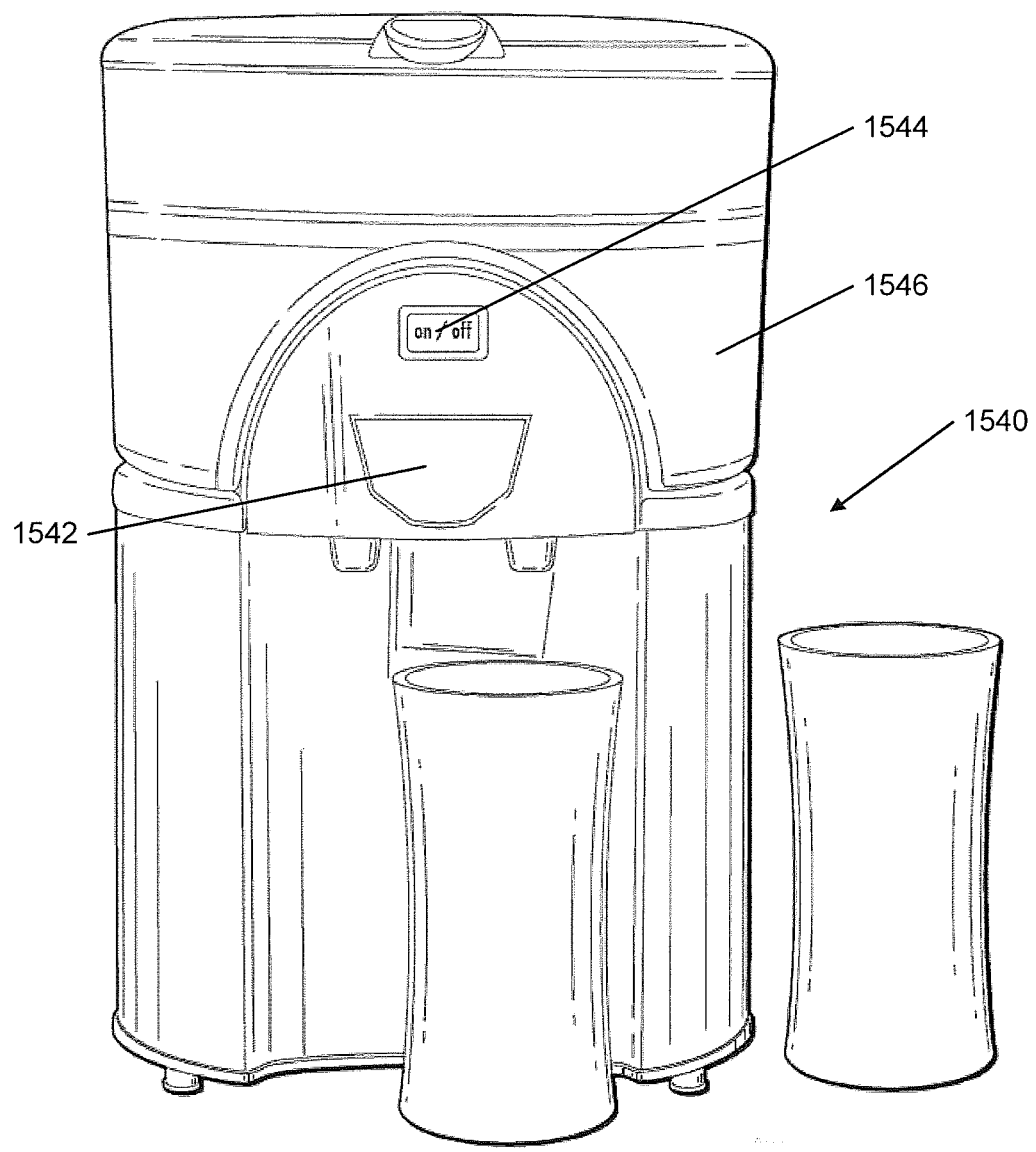
FIG. 19 illustrates an alternative example of a beverage system that may be used at a home in accordance with the present invention.
Figure 20:
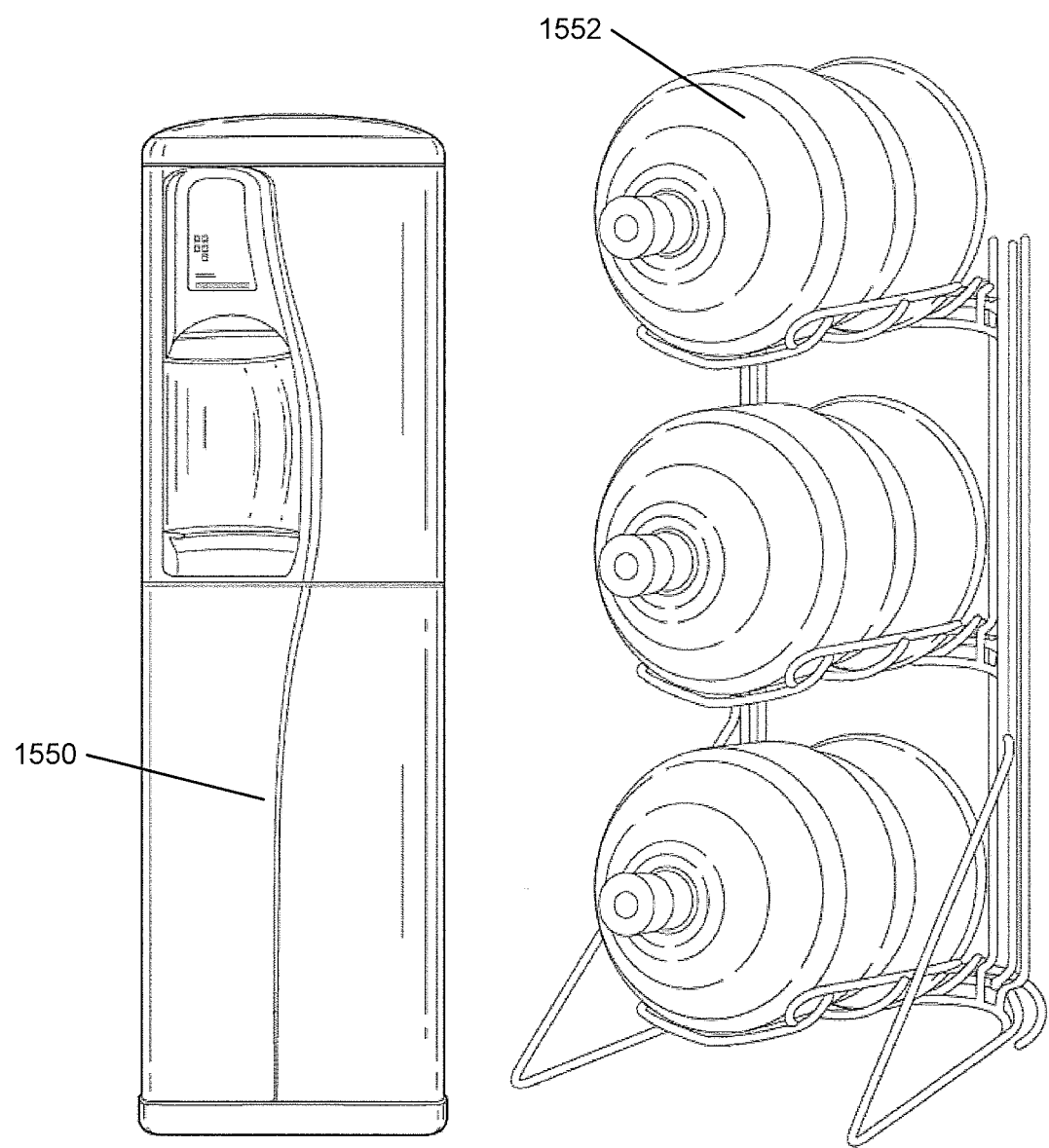
FIG. 20 illustrates an alternative example of a beverage system that may utilize large water containers in accordance with the present invention.

Referring to FIGS. 19-23, the beverage system may be packaged in numerous configurations. FIG. 19 depicts a beverage system 1540 that may be used at home where a cartridge may be placed within the opening 1542 and upon pressing the dispensing button 1544, water or other liquids stored within water housing 1546 mixes with the contents of the cartridge, similar to the manner described above, to make the desired beverage. FIG. 20 depicts yet another beverage system 1550 that operates in the same manner as described herein but utilizes large water containers 1552, similar to those used in drinking coolers. Still other packaging options are possible with the invention.

Figure 21:
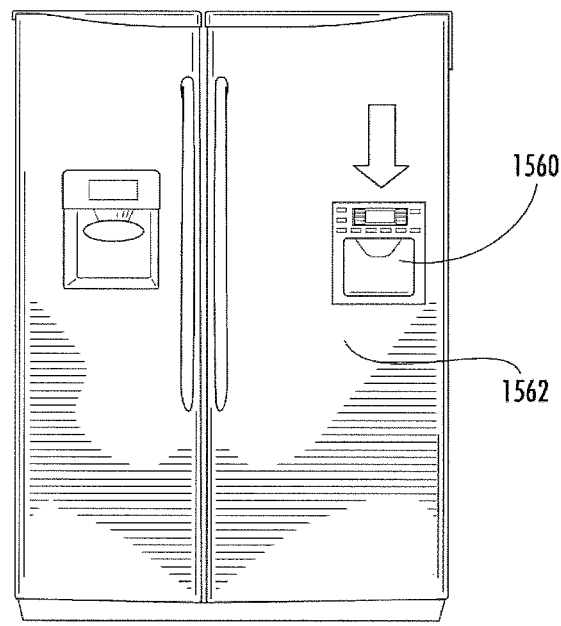
Figure 22:
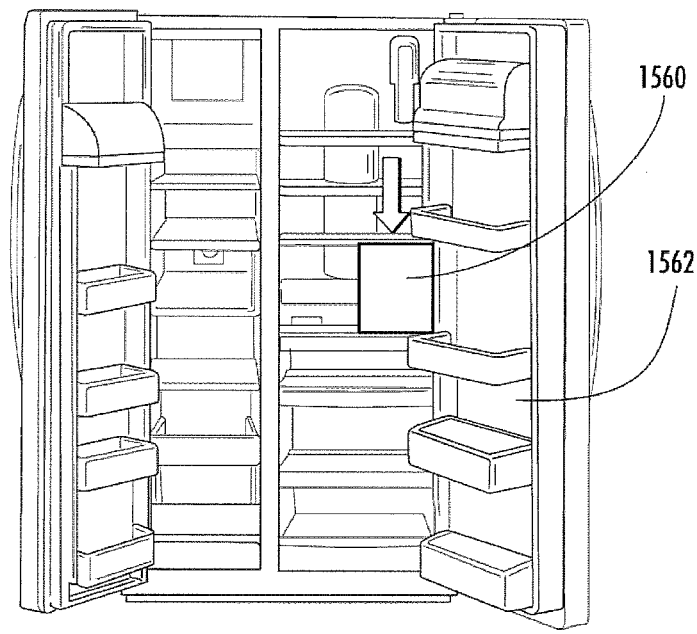

Referring to FIGS. 21-23, the beverage system 1560 may be configured with a refrigerator 1562. The beverage system 1560 may be mounted in or to the refrigerator, or attached as a stand-alone unit to the refrigerator. If the beverage system 1560 is mounted in or to the refrigerator, the system 1560 may be accessible from the exterior of the refrigerator (FIGS. 21 and 23) or may be accessible from the interior of the refrigerator (FIG. 22). As illustrated in FIG. 22, the beverage system may be mounted within a compartment located within the refrigerator. As illustrated in FIG. 23, the beverage systems may be incorporated with the ice/water dispensing system of the refrigerator. With each of these alternative embodiments, the beverage system 1560 may be attached to the drinking water supply of the refrigerator. If the beverage system 1560 is attached to the refrigerator as a stand-alone unit, it may be connected to the drinking water supply of the refrigerator. As with the other embodiments described herein, the cartridge 1570 may be placed within an opening 1564 and upon pressing the dispensing button, water from refrigerator 1562 mixes with the contents of the cartridge, similar to the manner described above, to make the desired beverage, which will then be dispensed into a cup 1574.

Described below is a detailed description of additional aspects of this invention, specifically a method of producing a beverage using a beverage dispensing system. Additional aspects of this disclosure relate to methods of producing a beverage using a beverage dispensing system in accordance with examples of this disclosure. Such methods may include, for example, one or more of the following steps in any desired order and/or combinations: (a) inserting a cartridge into a container; (b) rotating or positioning the cartridge into location within an attachment mechanism; (c) pressing on the cartridge thereby engaging the cartridge with the engagement assembly, releasing the valve assembly, and piercing the foil seal with the piercing portion; (d) mixing the contents of the container; (e) drinking the beverage from the container; and (f) releasing the cartridge from the container.

It is to be understood that the invention is not limited in its application to the details of construction and the arrangement of the components set forth herein. The invention is capable of other embodiments and of being practiced or being carried out in various ways. Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A beverage dispensing system comprising:
   a container configured to hold a liquid;
   an attachment mechanism coupled to the container, the attachment mechanism comprising an engagement assembly, a piercing portion, a valve, and an elevator cooperatively engaged with the valve; and
   a cartridge adapted to engage the attachment mechanism at the engagement assembly, the cartridge comprising a first chamber and a second chamber, an opening, and a cover located over the opening, the cover being cuttable during engagement of the cartridge and the attachment mechanism, the cartridge further comprising a cap attached to the top of the first chamber;
   wherein, when the cartridge is engaged with the attachment mechanism, the engagement assembly holds the cartridge within the attachment mechanism, the piercing portion pierces through the cover, and the valve extends into the container; and
   further wherein the first chamber holds a first beverage ingredient and the second chamber holds a second beverage ingredient different than the first beverage ingredient.

2. The beverage dispensing system according to claim 1, wherein the cap includes a foil retainer wherein when the cartridge engages the engagement assembly, the piercing portion pushes against the foil retainer, thereby piercing the cover with the foil retainer.

3. The beverage dispensing system according to claim 1, wherein the valve is hinged such that, when the cartridge is engaged with the attachment mechanism, the elevator pushes the valve and swings the valve to an open position, leaving the cartridge cover cut and folded open.

4. The beverage dispensing system according to claim 1, wherein the cartridge is generally a circular-shaped structure.

5. The beverage dispensing system according to claim 1, wherein the cover is a foil cover.

6. The beverage dispensing system according to claim 1, wherein the first beverage ingredient and the second beverage ingredient are selected from the list comprising: syrup, paste, powder, or granules.

7. The beverage dispensing system according to claim 1, wherein the first beverage ingredient includes a syrup and the second beverage ingredient includes a powder.

8. The beverage dispensing system according to claim 1, wherein the first beverage ingredient includes a syrup and the second beverage ingredient includes granules.

9. The beverage dispensing system according to claim 1, wherein the liquid is non-carbonated water.

10. The beverage dispensing system according to claim 9, wherein when the valve extends into the container, the cartridge is opened into the container thereby allowing the syrup and the powder to mix with the non-carbonated water.

11. The beverage dispensing system according to claim 1, wherein when the valve extends into the container, the cartridge is opened into the container thereby allowing the first beverage ingredient and the second beverage ingredient to mix with the liquid.

12. The beverage dispensing system according to claim 7, wherein the second beverage ingredient includes a vitamin.

13. The beverage dispensing system according to claim 7, wherein the second beverage ingredient includes an energy boost.

14. The beverage dispensing system according to claim 1, wherein the container includes a release mechanism that releases the cartridge from the attachment mechanism.

15. The beverage dispensing system according to claim 1, wherein the container includes a drinking spout.

16. A beverage dispensing system comprising:
   a container configured to hold a liquid;
   an attachment mechanism coupled to the container, the attachment mechanism comprising an engagement assembly, a piercing portion, a valve, and an elevator cooperatively engaged with the valve; and
   a cartridge adapted to engage the attachment mechanism at the engagement assembly, the cartridge comprising a first chamber and a second chamber, an opening, and a cover located over the opening, the cover being opened during engagement of the cartridge and the attachment mechanism, the cartridge further comprising a cap attached to the top of the first chamber, wherein the second chamber is located between the cap and the cover,
   wherein when the cartridge is engaged with the attachment mechanism, the engagement assembly holds the cartridge within the attachment mechanism, the piercing portion pierces through the cap and the cover, and the valve extends into the container, and further wherein the first chamber includes a first beverage ingredient and the second chamber includes a second beverage ingredient different than the first beverage ingredient, wherein when the valve extends into the container, the cartridge is opened into the container thereby allowing the first beverage ingredient and the second beverage ingredient to mix with the liquid.

17. The beverage dispensing system according to claim 16, wherein the first beverage ingredient and the second beverage ingredient are selected from the list comprising: syrup, paste, powder, or granules.

18. The beverage dispensing system according to claim 16, wherein the first beverage ingredient includes a syrup.

19. The beverage dispensing system according to claim 16, wherein the second beverage ingredient includes a powder.

20. The beverage dispensing system according to claim 19, wherein the second beverage ingredient includes a vitamin.

21. The beverage dispensing system according to claim 19, wherein the second beverage ingredient includes an energy boost.

22. The beverage dispensing system according to claim 16, wherein the container includes a release mechanism that releases the cartridge from the attachment mechanism.

23. The beverage dispensing system according to claim 16, wherein the container includes a drinking spout.

24. A beverage dispensing system comprising:
a container configured to hold a liquid;
an attachment mechanism coupled to the container, the attachment mechanism comprising an engagement assembly, a piercing portion, and a valve; and
a cartridge adapted to engage the attachment mechanism at the engagement assembly, the cartridge generally circular-shaped and comprising a first chamber and a second chamber, an opening, and a cover located over the opening, the cover being opened during engagement of the cartridge and the attachment mechanism, the cartridge further comprising a cap attached to the top of the first chamber,
wherein when the cartridge is engaged with the attachment mechanism, the engagement assembly holds the cartridge within the attachment mechanism, the piercing portion pierces through the cap and the cover, and the valve extends into the container, and
further wherein the first chamber includes a syrup and the second chamber includes a powder, wherein when the valve extends into the container, the cartridge is opened into the container thereby allowing the syrup and the powder to mix with the liquid.

* * * * *

UNITED STATES PATENT AND TRADEMARK OFFICE
CERTIFICATE OF CORRECTION

PATENT NO.         : 9,260,284 B2                                    Page 1 of 1
APPLICATION NO.    : 14/256735
DATED              : February 16, 2016
INVENTOR(S)        : Marina et al.

It is certified that error appears in the above-identified patent and that said Letters Patent is hereby corrected as shown below:

On the title page, item (71), replace "PepsiCo, Inc., New York, NY" with --PepsiCo, Inc., Purchase, NY--.

Signed and Sealed this
Third Day of May, 2016

Michelle K. Lee
*Director of the United States Patent and Trademark Office*